United States Patent
Park et al.

(10) Patent No.: US 9,189,101 B2
(45) Date of Patent: Nov. 17, 2015

(54) MOBILE TERMINAL AND CONTROL METHOD THEREOF

(71) Applicant: LG ELECTRONICS INC., Seoul (KR)

(72) Inventors: Jiyoung Park, Seoul (KR); Sujin Kim, Seoul (KR); Jumin Chi, Seoul (KR); Jaeho Choi, Seoul (KR); Sunghye Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 38 days.

(21) Appl. No.: 13/956,975

(22) Filed: Aug. 1, 2013

(65) Prior Publication Data

US 2014/0118258 A1    May 1, 2014

(30) Foreign Application Priority Data

Oct. 31, 2012    (KR) .......................... 10-2012-0122509

(51) Int. Cl.
*G06F 3/041* (2006.01)
*G06F 1/16* (2006.01)

(52) U.S. Cl.
CPC ............ *G06F 3/0416* (2013.01); *G06F 1/1647* (2013.01); *G06F 1/1694* (2013.01)

(58) Field of Classification Search
CPC .................. G06F 2203/04804; G06F 3/0418; G06F 3/0416; H04M 2250/16; G09G 2300/023
See application file for complete search history.

(56) References Cited

U.S. PATENT DOCUMENTS

| | | | |
|---|---|---|---|
| 5,651,107 A * | 7/1997 | Frank et al. .................... | 715/768 |
| 2005/0073512 A1* | 4/2005 | Liu ................................ | 345/204 |
| 2010/0001980 A1* | 1/2010 | Kim et al. ...................... | 345/184 |
| 2010/0103102 A1* | 4/2010 | Shih et al. ...................... | 345/158 |
| 2010/0164904 A1* | 7/2010 | Kim et al. ...................... | 345/174 |
| 2010/0188353 A1* | 7/2010 | Yoon et al. .................... | 345/173 |
| 2010/0194705 A1* | 8/2010 | Kim et al. ...................... | 345/173 |
| 2010/0277420 A1* | 11/2010 | Charlier et al. ............... | 345/173 |
| 2011/0102455 A1* | 5/2011 | Temple ......................... | 345/619 |
| 2012/0060089 A1* | 3/2012 | Heo et al. ...................... | 715/702 |
| 2012/0256854 A1* | 10/2012 | Lee et al. ...................... | 345/173 |
| 2013/0300673 A1* | 11/2013 | Lu .................................. | 345/173 |

* cited by examiner

*Primary Examiner* — Sanjiv D Patel
(74) *Attorney, Agent, or Firm* — KED & Associates LLP

(57) ABSTRACT

The present invention relates a mobile terminal capable of controlling contents displayed on a display unit, and a control method thereof. A mobile terminal according to one exemplary embodiment includes a terminal body, a transparent display unit having first and second transparent substrates both configured to sense touch inputs, a sensing unit to sense at least one of motion and rotation of the terminal body, and a controller to determine whether or not the sensed at least one of the motion and the rotation of the terminal body meets a preset condition information when an event is generated while a content is output on the first transparent substrate, and decide whether or not to display information relating to the generated event on the second transparent substrate based on the determination result.

12 Claims, 24 Drawing Sheets

FIG. 5
(a)
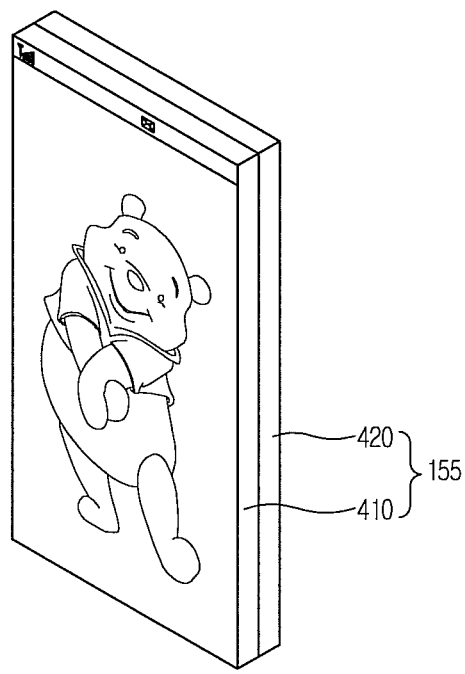
(b)
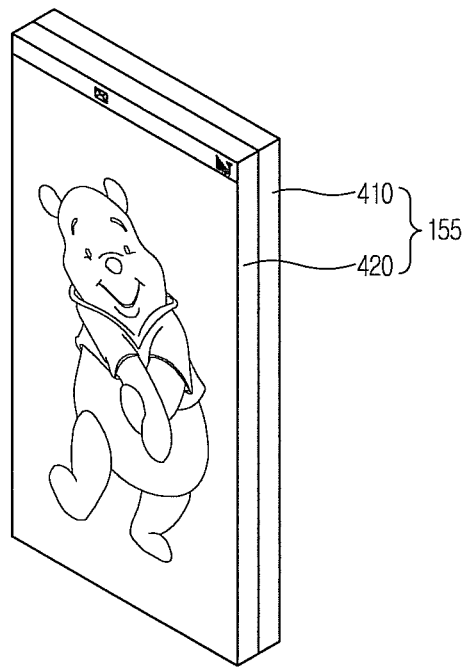

FIG. 6
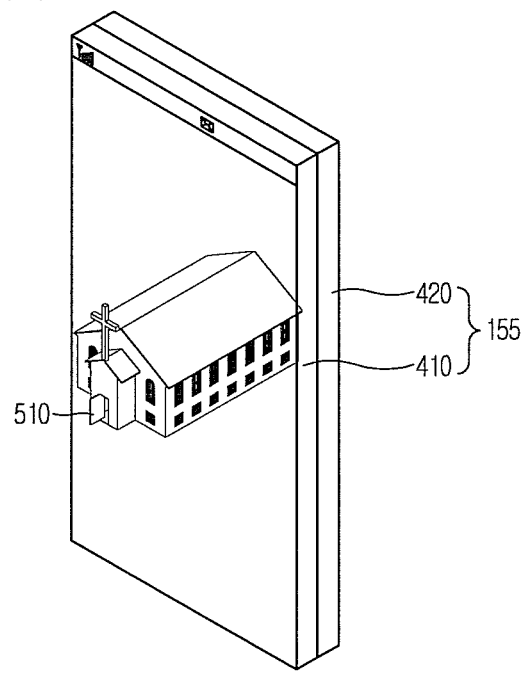
(a)
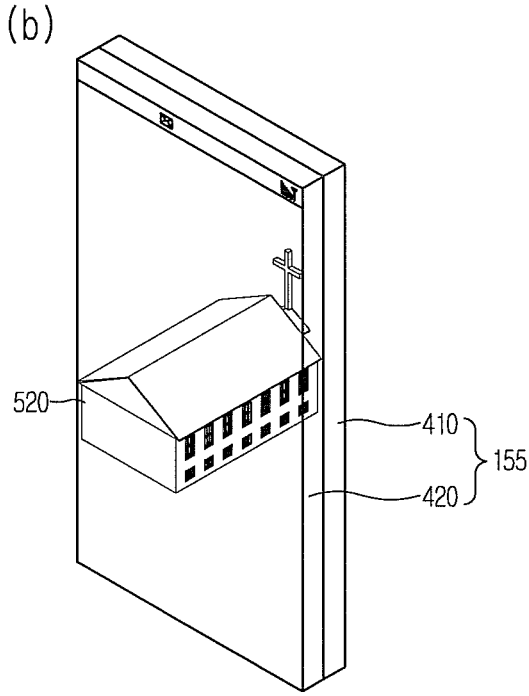
(b)

FIG. 20
(a) 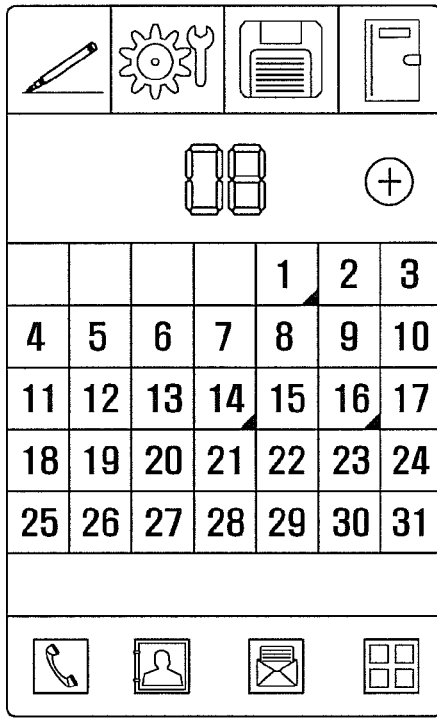
(b) 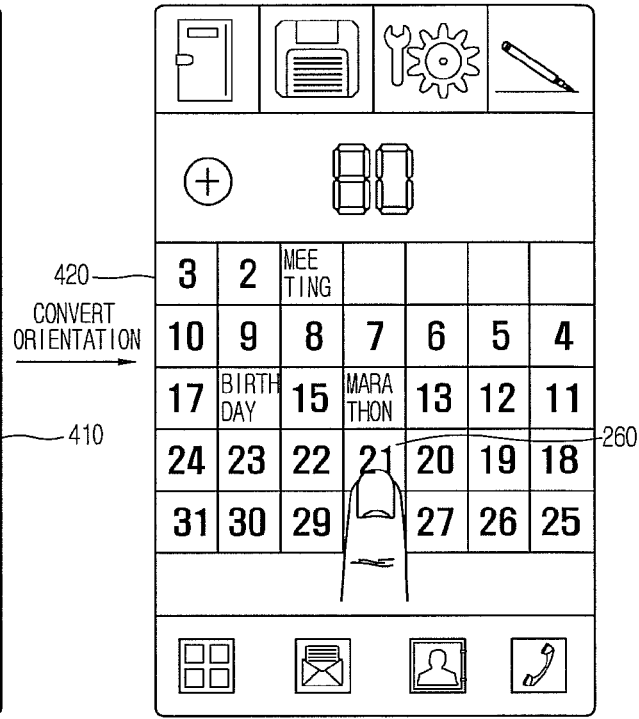
(d) 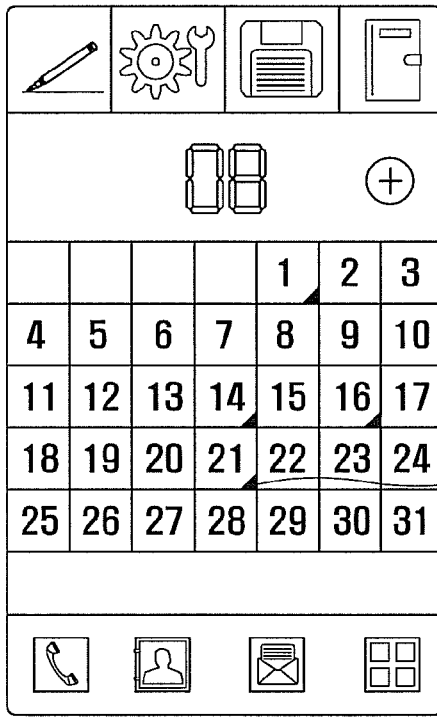
(c) 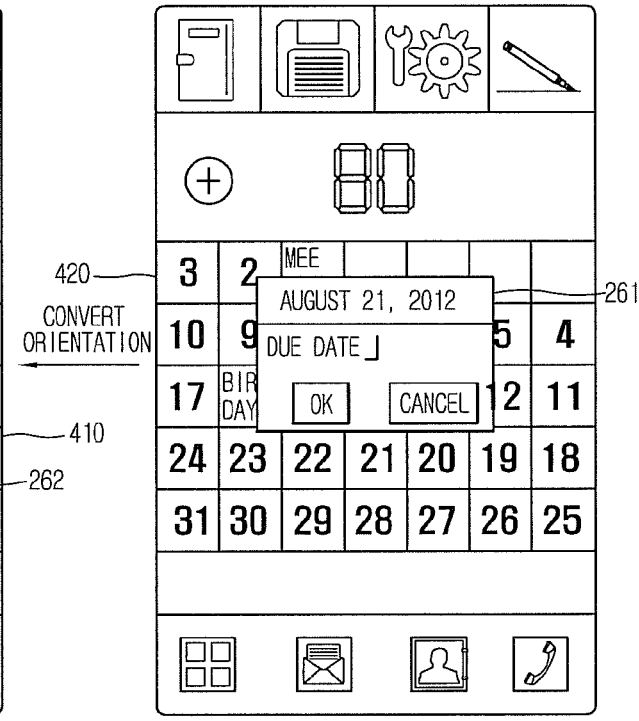

FIG. 21
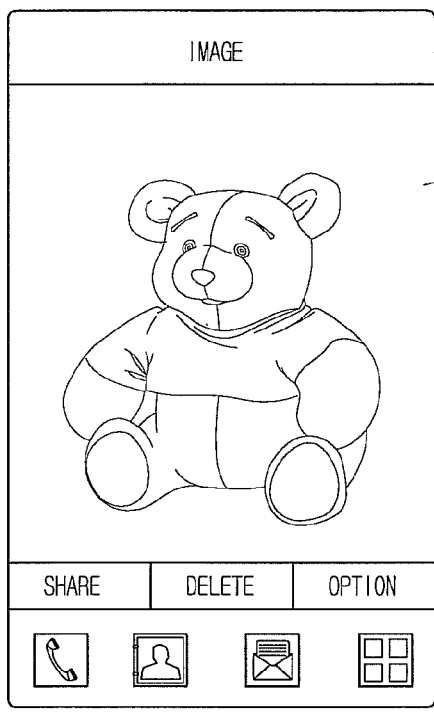
(a)
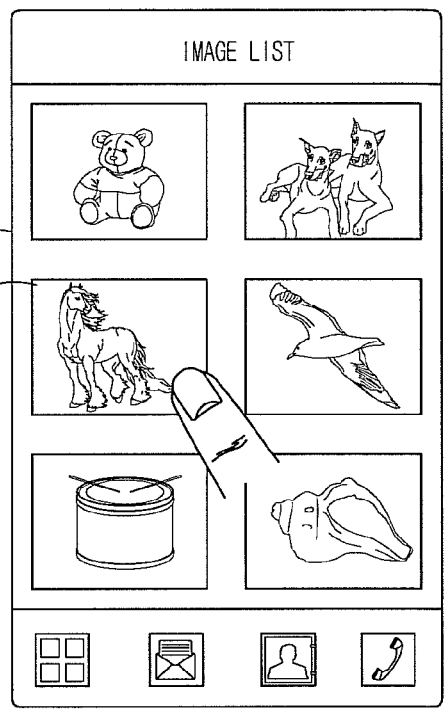
(b)
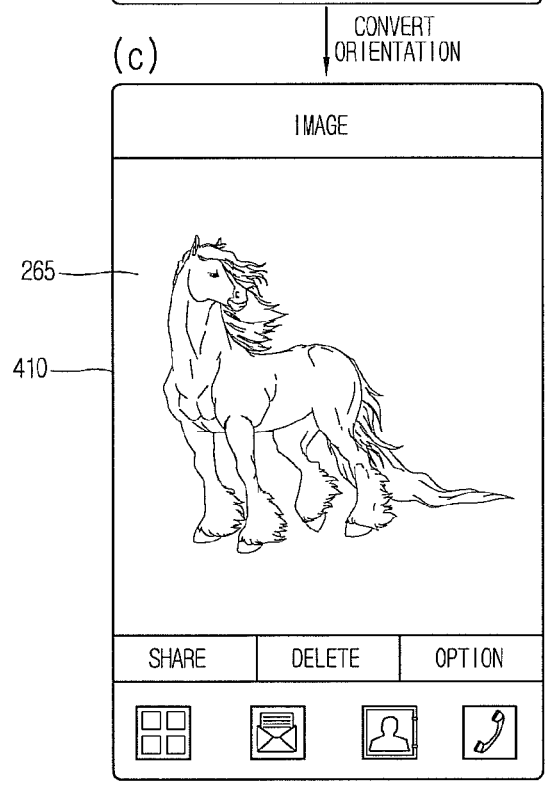
(c)

FIG. 23
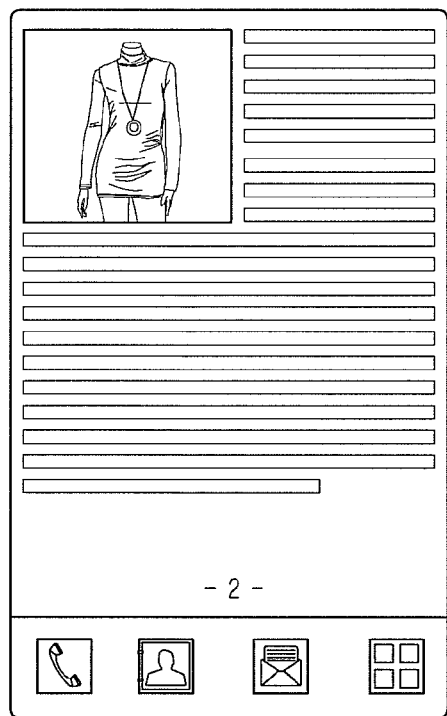
(a)
- 2 -
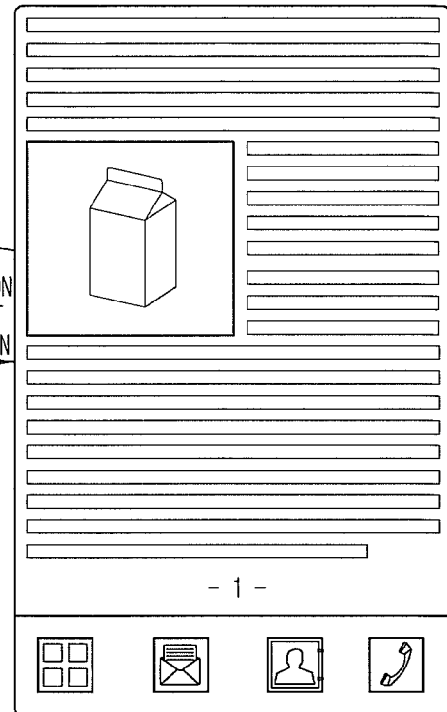
(b)
420 — CONVERSION TO FIRST DIRECTION
- 1 -
410
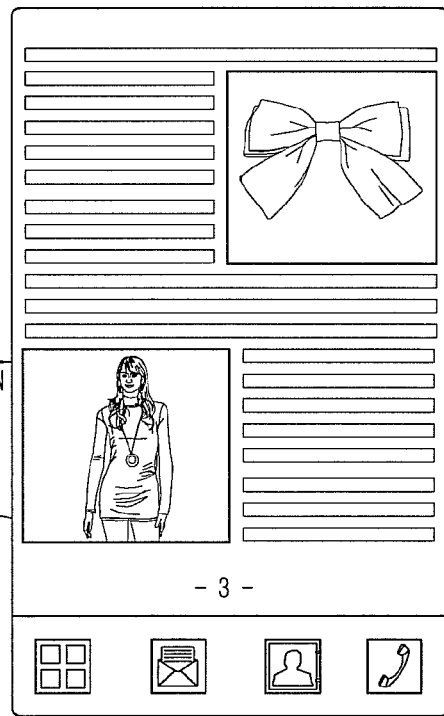
(c)
CONVERSION TO SECOND DIRECTION
420
- 3 -

MOBILE TERMINAL AND CONTROL METHOD THEREOF

CROSS-REFERENCE TO RELATED APPLICATION(S)

Pursuant to 35 U.S.C. §119(a), this application claims the benefit of earlier filing date and right of priority to Korean Application No. 10-2012-0122509, filed on Oct. 31, 2012, the contents of which is incorporated by reference herein in its entirety.

BACKGROUND

1. Field

This specification relates to a mobile terminal, and particularly, to a mobile terminal capable of controlling contents displayed on a display unit, and a control method thereof.

2. Background

Terminals may be divided into mobile/portable terminals and stationary terminals according to their mobility. Mobile terminals (mobile device, portable device, portable terminal) can be easily carried and have one or more of functions such as supporting voice and video telephony calls, inputting and/or outputting information, storing data and the like.

As it becomes multifunctional, the portable terminal can be allowed to capture still images or moving images, play music or video files, play games, receive broadcast and the like, so as to be implemented as a multimedia player. Various new attempts have been made for the multimedia devices by hardware or software in order to implement such complicated functions.

With the improvement, the terminal may output contents on a display unit. However, when an event is generated while the contents are output, it causes inconvenience in that at least part of a screen for displaying the contents is obscured to display information relating to the generated event.

When a user desires to view detailed information related to the generated event with a content display screen being output on the display unit, it causes user's inconvenience due to complicated manipulations.

SUMMARY OF THE INVENTION

Therefore, an aspect of the detailed description is to provide a mobile terminal capable of improving user's convenience in the aspect of displaying information relating to an event generated while a content display screen is displayed on a display unit, and a control method thereof.

To achieve these and other advantages and in accordance with the purpose of this specification, as embodied and broadly described herein, there is provided a mobile terminal including a terminal body, a transparent display unit having first and second transparent substrates both configured to sense touch inputs, a sensing unit to sense at least one of motion and rotation of the terminal body, and a controller to determine whether or not the sensed at least one of the motion and the rotation of the terminal body meets a preset condition information when an event is generated while a content is output on the first transparent substrate, and decide whether or not to display information relating to the generated event on the second transparent substrate based on the determination result.

In accordance with one aspect of the present disclosure, the controller may display an object indicating the generation of the event on the first transparent substrate for a preset time when the event is generated.

In accordance with one aspect of the present disclosure, the controller may display information related to the generated event on the second transparent substrate when the sensed at least one of the motion and the rotation of the terminal body meets the preset condition information while the content is output on the first transparent substrate.

In accordance with one aspect of the present disclosure, the controller may adjust brightness of the second transparent substrate when the information is displayed on the second transparent substrate as the sensed at least one of the motion and the rotation of the terminal body meets the preset condition information.

In accordance with one aspect of the present disclosure, the controller may control the object not to be displayed on the first transparent substrate any more when a touch input is sensed on the second transparent substrate.

In accordance with one aspect of the present disclosure, the controller may display an event list, which includes the generated event item, on the second transparent substrate when the sensed at least one of the motion and the rotation of the terminal body meets the preset condition information while the content is output on the first transparent substrate.

In accordance with one aspect of the present disclosure, the controller may display information relating to an event corresponding to an event item on the second transparent substrate when the corresponding event item is selected from a plurality of event items included in the event list displayed on the second transparent substrate.

In accordance with one aspect of the present disclosure, the controller may display an object indicating the generation of the event on the second transparent substrate for a preset time when the event is generated.

In accordance with one aspect of the present disclosure, the controller may display information relating to the event on the first transparent substrate when the object displayed on the second transparent substrate is dragged in a preset direction.

In accordance with one aspect of the present disclosure, the controller may output the content, being output on the first transparent substrate, on the second transparent substrate with displaying the information relating to the event on the first transparent substrate.

In accordance with one aspect of the present disclosure, the controller may detect at least one of direction information and length information relating to a touch input sensed on at least one of the first and second transparent substrates, and adjust transparency of the at least one of the first and second transparent substrates based on the detected information.

In accordance with one aspect of the present disclosure, the controller may generate a control command for adjusting transparency of at least one of the first and second transparent substrates when touch inputs are sensed simultaneously on both the first and second transparent substrates.

In accordance with one aspect of the present disclosure, the controller may display indicator bars, which indicates transparency information relating to at least one of the first an second transparent substrate, on the transparent display unit when a touch input is sensed on at least one of the first and second transparent substrates.

In accordance with one exemplary embodiment, the controller may decide which one of the first and second transparent substrates is used to display the indicator bars, based on whether or not the sensed at least one of the motion and the rotation of the terminal body meets the preset condition information.

In accordance with one aspect of the present disclosure, the controller may switch screens displayed on the respective first and second transparent substrates with each other when the length of the touch input sensed on the at least one of the first and second transparent substrates is more than a preset length.

In accordance with one aspect of the present disclosure, the sensing unit may include at least one of a terrestrial magnetism sensor, a gyro sensor and an acceleration sensor.

In accordance with one aspect of the present disclosure, the controller may recognize at least one of a user's eye and a user's face, decide as a main screen one of the first and second transparent substrates, the one facing the user's eye or the user's face, and output the content on the main screen. Here, the controller may display the information relating to the generated event on the other of the first and second transparent substrates when it is detected that the main screen is oriented opposite to a preset direction.

In accordance with one aspect of the present disclosure, the controller may determine whether a touch input is sensed on either the first transparent substrate or the second transparent substrate, decide as a main screen a touch input-sensed substrate of the first and second transparent substrates, and output the content on the main screen. The controller may display the information relating to the generated event on the other of the first and second transparent substrates when it is detected that the main screen is orientated opposite to a preset direction.

In accordance with another exemplary embodiment, a mobile terminal may include a terminal body, a transparent display unit having first and second transparent substrates both configured to sense touch inputs, a sensing unit to sense at least one of motion and rotation of the terminal body, and a controller to determine whether or not the sensed at least one of the motion and the rotation of the terminal body meets a preset condition information while a content output screen is displayed on the first transparent substrate, and decide whether or not to display another screen associated with the content output screen on the second transparent substrate according to the determination result.

In accordance with one aspect of the present disclosure, the controller may display the another screen on the second transparent substrate when the at least one of the motion and the rotation of the terminal body meets the preset condition information while the content output screen is displayed on the first transparent substrate.

In accordance with one aspect of the present disclosure, the another screen displayed on the second transparent substrate may include at least one of a detailed information display screen for the content, a setting screen for the content and an edit screen for the content.

In accordance with one aspect of the present disclosure, the controller may apply information, which has been changed on one of the setting screen and the edit screen displayed on the second transparent substrate, to the content output screen displayed on the first transparent substrate.

In accordance with one aspect of the present disclosure, the controller may scroll a screen displayed on one of the first and second transparent substrates having a scroll input sensed thereon, while maintaining a screen displayed on the other, when the scroll input is sensed on the one of the first and second transparent substrates.

In accordance with one aspect of the present disclosure, the controller may display a contents list on the second transparent substrate. When one of a plurality of content items included in the contents list is selected, the controller may display a content output screen corresponding to the selected content item on the first transparent substrate.

In accordance with one aspect of the present disclosure, the controller may display, as the another screen displayed on the second transparent substrate, a content output screen for an opposite surface to one surface of an object to be captured, when a content output screen for the one surface of the object to be captured is displayed on the first transparent substrate.

In accordance with one aspect of the present disclosure, the controller may display, as the another screen displayed on the second transparent substrate, a content output screen for one of a previous page and the next page of a predetermined page of an electronic document when a content output screen for the predetermined page of the electronic document is displayed on the first transparent substrate.

In accordance with one aspect of the present disclosure, the sensing unit may sense a rotated direction of the terminal body, and the controller may decide whether to display either the previous page or the next page on the second transparent substrate based on the rotated direction of the terminal body.

To achieve these and other advantages and in accordance with the purpose of this specification, as embodied and broadly described herein, there is provided a control method for a mobile terminal including a terminal body and a transparent display unit having first and second transparent substrates configured to sense touch inputs, the method including outputting a content on the first transparent substrate, sensing at least one of motion and rotation of the terminal body, determining whether or not the sensed at least one of the motion and rotation of the terminal body meets a preset condition information when an event is generated while the content is output on the first transparent substrate, and deciding whether or not to display information relating to the generated event on the second transparent substrate based on the determination result.

In accordance with another exemplary embodiment, there is provided a control method for a mobile terminal including a terminal body and a transparent display unit having first and second transparent substrates configured to sense touch inputs. The control method may include outputting a content output screen on the first transparent substrate, sensing at least one of motion and rotation of the terminal body, determining whether or not the sensed at least one of the motion and rotation of the terminal body meets a preset condition information while the content output screen is displayed on the first transparent substrate, and deciding whether or not to display another screen associated with the content output screen on the second transparent substrate based on the determination result.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIGS. 5 and 6 are exemplary views showing contents output on the transparent display unit in accordance with the one exemplary embodiment;

FIGS. 18 to 23 are conceptual views showing exemplary operations of the mobile terminal according to FIG. 17.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
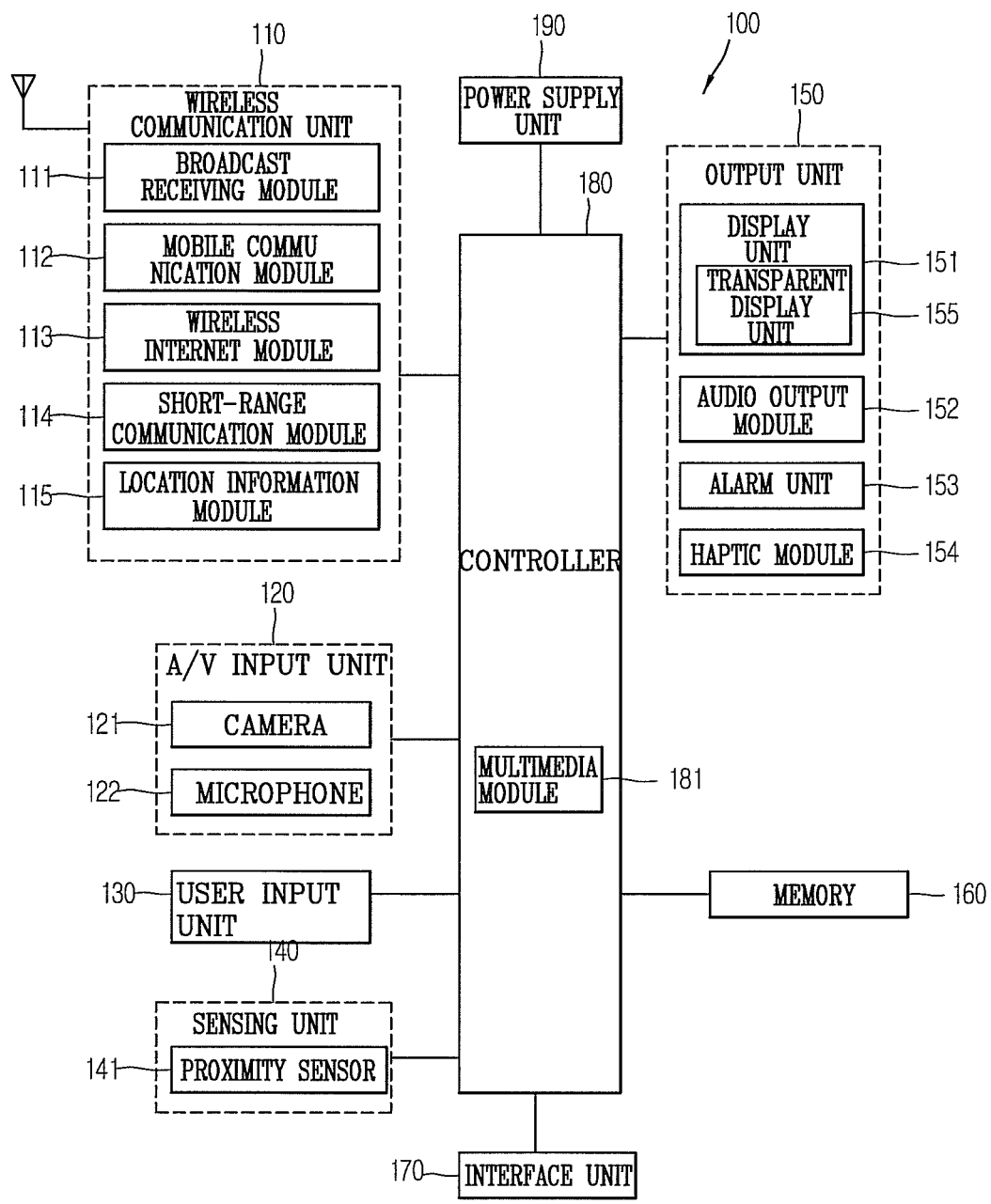
FIG. 1 is a block diagram of a mobile terminal in accordance with one exemplary embodiment.

FIG. 1 is a block diagram of a mobile terminal 100 in accordance with one exemplary embodiment. Referring to FIG. 1, the mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Still referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The sensing unit 140 may include a proximity sensor 141. Also, the sensing unit 140 may include a touch sensor (not shown) which senses a touch operation with respect to the display unit 151.

The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure.

Here, if the display unit 151 and a touch sensitive sensor (referred to as a touch sensor) have a layered structure therebetween, the display unit 151 may be used as an input device rather than an output device. The display unit 151 with the structure may be referred to as a touch screen.

When touch inputs are applied via the touch screen, corresponding signals are transmitted to a touch controller. The touch controller processes the received signals, and then transmits corresponding data to the controller 180. Accordingly, the controller 180 may sense which region of the display unit 151 has been touched.

When the touch screen is implemented as a capacitance type, proximity of a pointer to the touch screen is sensed by changes of an electromagnetic field. In this case, the touch screen (touch sensor) may be categorized into the proximity sensor 141.

The proximity sensor 141 indicates a sensor to sense presence or absence of an object approaching to a surface to be sensed by using an electromagnetic field or infrared rays without a mechanical contact. The proximity sensor 141 has a longer lifespan and a more enhanced utility than a contact sensor.

Examples of the proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the object to be sensed is positioned to be proximate onto the touch screen without contact will be referred to as 'proximity touch', whereas a status that the object to be sensed substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI), which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such display units 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations.

The software codes can be implemented with a software application written in any suitable programming language. Also, the software codes may be stored in the memory 160 and executed by the controller 180.

Hereinafter, description will be given of a method for processing a user input onto the mobile terminal 100.

The user input unit 130 may be manipulated to allow inputting of commands for controlling operations of the mobile terminal 100, and include a plurality of first manipulation units 131, 132. The plurality of manipulation units 131, 132 may be referred to as a manipulating portion. Such manipulating portion can employ any tactile manner that a user can touch or tap for manipulation.

Various types of visual information may be displayed on the display unit 151. The information may be displayed in the form of character, number, symbol, graphic, icon, etc, or may be configured as a 3D stereoscopic image.

In order to input such information, at least one of the characters, numbers, symbols, graphics and icons are displayed in a certain array so as to be implemented in the form of a keypad. Such keypad may be called 'soft key'.

The display unit 151 may be operated as a whole region or may be divided into a plurality of regions and accordingly operated. In the latter case, the plurality of regions may be operation in association with each other.

For example, an output window and an input window may be displayed at upper and lower portions of the display unit 151, respectively. The output window and the input window are regions allocated for outputting or inputting information, respectively. Soft keys including numbers for inputting a phone number, or the like, are outputted to the input window. When the soft key is touched, a number corresponding to the touched soft key is displayed on the output window. When the first manipulation unit is manipulated, a call connection with respect to a phone number displayed on the output window is attempted, or text displayed on the output window may be input to an application.

The display unit 151 or the touch pad may be configured to receive a touch through scrolling. The user may move a cursor or a pointer positioned on an entity, e.g., an icon, or the like, displayed on the display unit 151 by scrolling the display unit 151 or the touch pad. In addition, when the user moves his fingers on the display unit 151 or the touch pad, the path along which the user's fingers move may be visually displayed on the display unit 151. This would be useful in editing an image displayed on the display unit 151.

One function of the terminal may be executed in case where the display unit 151 (touch screen) and the touch pad are touched together within a certain time range. The both touches may be clamping the terminal body with the user's thumb and index finger. The executed one function of the mobile terminal 100 may be, for example, activation or deactivation of the display unit 151 or the touch pad.

Figure 2A:
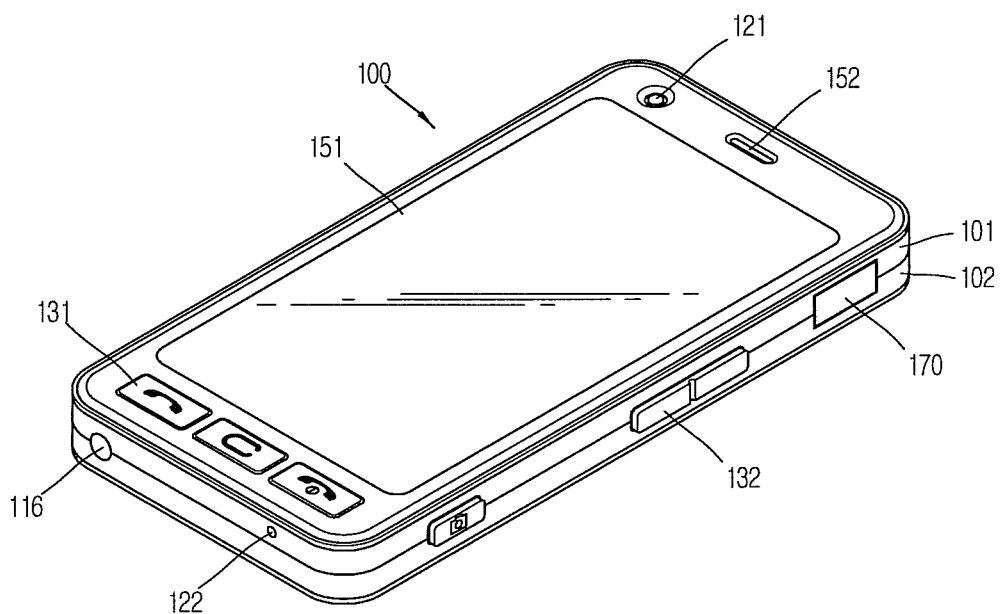
FIGS. 2A and 2B are perspective views showing an appearance of the mobile terminal in accordance with the one exemplary embodiment.
Figure 2B:
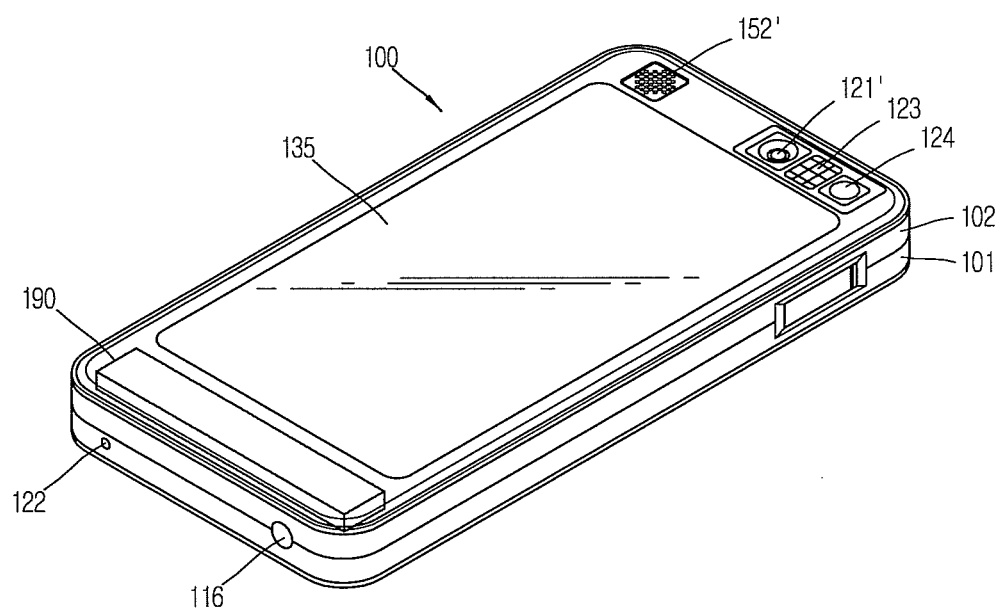

FIGS. 2A and 2B are perspective views showing an appearance of the mobile terminal in accordance with the one exemplary embodiment. FIG. 2A shows a front surface and one side surface of the mobile terminal 100. FIG. 2B shows a rear surface and another side surface of the mobile terminal 100.

Referring to FIG. 2A, the mobile terminal 100 disclosed herein is provided with a bar-type terminal body. However, the present application is not limited to this type of terminal, but is also applicable to various structures of terminals such as slide type, folder type, swivel type, swing type, and the like, in which two or more bodies are combined with each other in a relatively movable manner.

A terminal body may include a case (or referred to as casing, housing, cover, etc.) defining an appearance of the mobile terminal 100. In this exemplary embodiment, the case may be divided into a front case 101 and a rear case 102. Various electronic components are installed in the space between the front case 101 and the rear case 102. At least one intermediate case may be additionally disposed between the front case 101 and the rear case 102.

Such cases may be injected using a synthetic resin or be formed of a metal, such as stainless steel (STS), titanium (Ti), aluminum (Al) or the like.

The terminal body, usually the front case 101 may be shown having a display unit 151, an audio output module 152, a user input unit 130 (see FIG. 1), a microphone 122, an interface unit 170 and the like.

The display unit 151 may occupy most of a principal surface of the front case 101. The audio output module 152 and the camera 121 may be disposed near one of both end portions of the display unit 151, and a first user input unit 131 and the microphone 122 on the other end portion of the display unit 151. A second user input unit 132, the interface unit 170 and the like may be disposed on side surfaces of the front and rear cases 101 and 102.

The user input unit 130 may be manipulated to allow inputting of commands for controlling operations of the mobile terminal 100, and include a plurality of manipulation units 131 and 132.

The first and second manipulation units 131 and 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

The rear surface, namely, the rear case 102 of the terminal body may further be provided with a rear camera 121'. The rear camera 121' faces a direction which is opposite to a direction faced by the front camera 121 (see FIG. 2A), and may have different pixels from those of the front camera 121.

For example, the front camera 121 may operate with relatively lower pixels (lower resolution) and the rear camera 121' may operate with relatively higher pixels. Thus, the front camera 121 may be useful when a user can capture his face and send it to another party during a video call or the like. This may result in reduction of a size of the transmitted data. On the other hand, the rear camera 121' may be useful for a user to obtain higher quality pictures for later use.

The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

A rear audio output module 152' may further be disposed at a rear face of the terminal body, namely, the rear case 102. The rear audio output module 152' can cooperate with the front audio output module 152 (see FIG. 2A) to provide stereo output. Also, the rear audio output module 152' may be configured to operate as a speakerphone.

A broadcast signal receiving antenna 116 may further be disposed at the side surface of the terminal body, in addition to an antenna for call connection. The antenna forming a part of the broadcast receiving module 111 (see FIG. 1) may be retractably into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display unit 151 (see FIG. 2A), the touchpad 135 may be implemented as a light-transmissive type. A rear display unit may further be mounted on the touchpad 135 to output visual information even on the touchpad 135. Here, the information output on the front display unit 151 and the rear display unit may be controlled by the touchpad 135.

The touchpad 135 may operate mutually in association with the display unit 151. The touchpad 135 may be provided on the rear of the display unit 151 in parallel to each other. The touchpad 135 may have a size the same as or smaller than the size of the display unit 151.

A transparent display unit 155 according to the present disclosure will be described again. The transparent display unit 155 has a characteristic of transmitting light with displaying an image on a screen. This may allow a user to visually recognize an object located at the opposite side of the transparent display unit 155.

To implement the transparent display unit 155, an inorganic thin film electroluminescent display and an organic light emitting diode (OLED) may be used. Those modules are a passive matrix type, so any TFT is not required. This may result in highly increasing optical transmittance. Thus, with use of the modules, the transparent display unit 155 may be implemented.

Even for an active matrix type OLED using a TFT, when the TFT is fabricated using a transparent material such as a multi-composition oxide semiconductor, the optical transmittance may sufficiently increase. Therefore, the transparent display unit 155 may be implemented.

Figure 3:
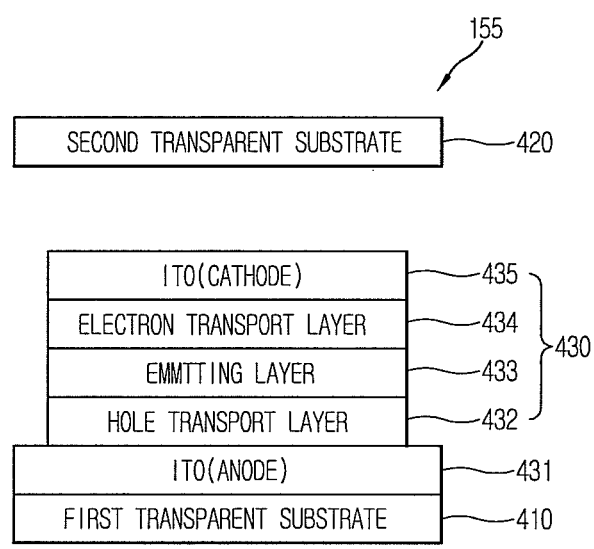
FIG. 3 is a block diagram showing a transparent display unit in accordance with one exemplary embodiment.

FIG. 3 is a block diagram showing a transparent display unit 155 in accordance with one exemplary embodiment.

Referring to FIG. 3, the transparent display unit 155 may include a first transparent substrate 210, a second transparent substrate 420, and an image layer 430 interposed between the first transparent substrate 410 and the second transparent substrate 420. Here, the image layer 430 located between the first transparent substrate 410 and the second transparent substrate 420 may be referred to as an organic cell. Here, light can be transmitted through the first transparent substrate 410 and the second transparent substrate 420.

The image layer 430 may include an anode 431, a hole transport layer 432, an emitting layer 433, an electron transport layer 434 and a cathode 435.

Here, when a voltage is applied to the cathode 435 and the anode 431, a grayscale current may be supplied to them. Accordingly, electrons generated from the cathode 435 may be carried to the emitting layer 433 via the electron transport layer 434.

In addition, holes generated from the anode 431 may be carried to the emitting layer 433 via the hole transport layer 432. Here, the electrons supplied from the electron transport layer 434 and the holes supplied from the hole transport layer 432 may collide with each other on the emitting layer 433 so as to be re-coupled to each other. The collision between the electrons and the holes may generate light from the emitting layer 433. Brightness of the light generated from the emitting layer 433 may be proportional to an amount of the grayscale current supplied to the anode 431.

When the light is generated from the emitting layer 433, the light may be emitted either toward the first transparent substrate 410 or toward the second transparent substrate 420. This may allow the user to view an image through the second transparent substrate 420 as well as the first transparent substrate 410.

Figure 4:
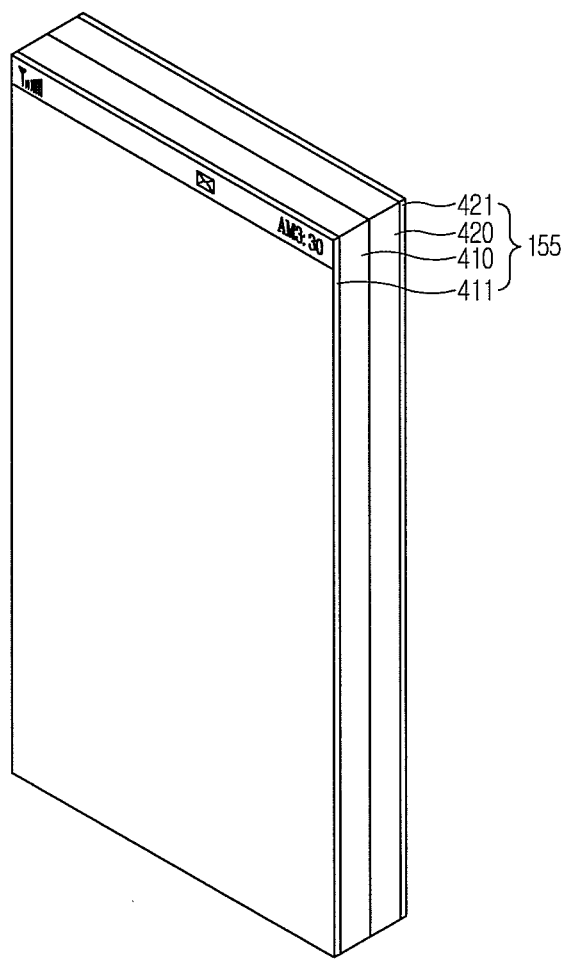
FIG. 4 is a conceptual view showing the transparent display unit in accordance with the one exemplary embodiment.

FIG. 4 is a conceptual view showing the transparent display unit 155 in accordance with the one exemplary embodiment.

As shown in FIG. 4, the transparent display unit 155 may include the first and second transparent substrates 410 and 420 and first and second touch panels 411 and 421. The first and second touch panels 411 and 421 may be disposed on the first transparent substrate 410 and the second transparent substrate 420 of the transparent display unit 155, respectively. Here, the first and second touch panels 411 and 421 may have various structures, such as a capacitance touch panel, a press-type touch panel, an optical touch panel and the like.

Hereinafter, the first and second touch panels 411 and 421 may not be illustrated for convenience of explanation, but generating a touch input means that one of the first and second touch panels 411 and 421 has been disposed on an area where the touch is generated.

FIGS. 5 and 6 are exemplary views showing a content output on the transparent display unit in accordance with the one exemplary embodiment.

When a user faces the first transparent substrate 410, the user may view an image output on the transparent display unit 155 in the form as shown in FIG. 5(a). Here, when the user turns over the body of the mobile terminal 100 to the other side, the user may view an image output on the second transparent substrate 420 in the form as shown in FIG. 5(b). That is, the images output on the first and second transparent substrates 410 and 420 may be images which are left-right inversed images from each other.

Or, the first and second transparent substrates 410 and 420 may output different images from each other. Referring to FIG. 6(a) and FIG. 6(b), the first transparent substrate 410 may output a first image 510, and the second transparent substrate 420 may output a second image 520 which is different from the first image 510. Here, the first image 510 may be an image obtained by capturing an object in a first direction, and the second image 520 may be an image obtained by capturing the object in a second direction which is reverse to the first direction.

In other words, the first image 510 may be the front view of the object and the second image may be the rear view of the object. For example, referring to FIG. 6, when an object is a house, the first image 510 may be an image that the house has been captured in a first direction, and the second image 520 may be an image that the house has been captured in a second direction which is reverse to the first direction.

Here, a provider of image contents, for example, a broadcasting station may send to the mobile terminal 100 both the image of the object captured in the first direction and the image of the object captured in the second direction which is reverse to the first direction.

Hereinafter, description will be given of the mobile terminal 100 capable of improving user's convenience in displaying information relating to an event generated while a content display screen is output on the first transparent substrate 410 of the transparent display unit 155, and a control method thereof, with reference to the accompanying drawings.

Figure 7A:
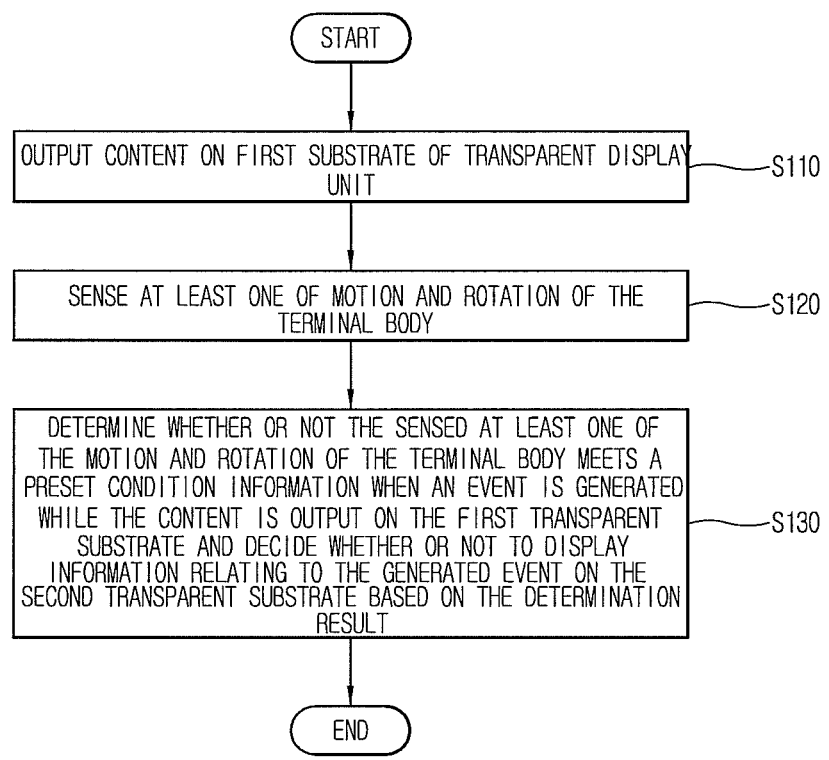
FIG. 7A is a flowchart showing one exemplary embodiment of a control method for a mobile terminal according to the present disclosure.

FIG. 7A is a flowchart showing one exemplary embodiment of a control method for a mobile terminal 100 (see FIG. 1) according to the present disclosure. The mobile terminal 100 may include the transparent display unit 155 (see FIG. 1), the sensing unit 140 (see FIG. 1) and the controller 180 (see FIG. 1).

Referring to FIG. 7A, a content may be output on the first transparent substrate 410 of the transparent display unit 155 (S110).

As aforementioned, the transparent display unit 155 may include the first and second transparent substrates 410 and 420. The first and second transparent substrates 410 and 420 may be configured to display contents, respectively. Also, contents may be displayed on one of the first and second transparent substrates 410 and 420, and the contents displayed on the one substrate may be transmitted onto the other.

As such, the first transparent substrate 410 of the transparent display unit 155 may display the contents. Here, the contents refer to various information or the like output by the mobile terminal 100, a computer and the like. In detail, the contents may indicate information relating to producing, processing and circulating at least one of text data, image data, video data and audio data in a digital manner. The contents may be provided to the mobile terminal 100 or the computer via an Internet or computer communication.

Next, at least one of motion and rotation of a terminal body may be sensed (S 120).

As one example of sensing the at least one of motion and rotation of the terminal body, the sensing unit 140 may include a motion recognition sensor (not shown). The motion recognition sensor may include at least one of a terrestrial magnetism sensor, a gyro sensor and an acceleration sensor.

The terrestrial magnetism sensor is a sensor which detects direction and magnitude of the terrestrial magnetism and generates an electric signal using the detected results. The gyro sensor is a sensor which detects a rotation speed of a terminal body and generates an electric signal using the detected result. The acceleration sensor is a sensor which measures a direction of a gravity acceleration, detects the change of acceleration in any one direction and generates an electric signal using the obtained results.

Accordingly, the sensing unit 140 may sense whether or not the terminal body has rotated. That is, the sensing unit 140 may detect a displacement according to the rotation of the terminal body, namely, a rotated direction and a rotated angle, and generate an electric signal using the detected results. The sensing unit 140 may thus sense an orientation that the transparent display unit 155 faces by detecting the rotated direction and the rotated angle of the terminal body.

As another example of sensing the at least one of the motion and the rotation of the terminal body, the sensing unit 140 may include an eye detector (not shown). The eye detector may detect user's eyes using at least one of the camera 121 (see FIG. 1) and an infrared sensor (not shown).

In detail, infrared rays emitted from the infrared sensor may be reflected on the retina in the user's eye within a predetermined viewing range based on the transparent display unit 155. Afterwards, the eye detector may detect the user's view using the inputted infrared rays or a user image obtained by the camera 121. Accordingly, the sensing unit 140 may sense whether the user is viewing either the first transparent substrate 410 or the second transparent substrate 420 of the transparent display unit 155.

As another example of sensing at least one of the motion and the rotation of the terminal body, whether or not an orientation of a main screen is converted (switched, turned, changed, etc.) may be used.

In detail, when a touch input for releasing a sleep mode is sensed on one surface of the mobile terminal 100 at the moment of releasing the sleep mode, the controller 180 may set the touch input-sensed surface (for example, the first transparent substrate 410) to a main screen. In addition to this, the controller 180 may set a surface where a touch input is not sensed (for example, the second transparent substrate 420) to a sub screen. The controller 180 may thus recognize that the orientation that the transparent display unit 155 is facing the user is the first transparent substrate 410 as the main screen.

The main screen and the sub screen may be switched according to on which surface a touch input has been sensed each time when the sleep mode is released. Also, the main screen and the sub screen may be switched according to on which surface a touch input has been sensed each time when a lock screen is unlocked.

The sensing unit 140 may detect an orientation of the main screen. For example, the sensing unit 140 may detect that the main screen is toward a preset direction. To this end, the sensing unit 140 may include a light sensor which is disposed on at least one of the first and second transparent substrates 410 and 420. For example, when the mobile terminal 100 is laid on a floor, the sensing unit 140 may detect using the light sensor that the main screen faces the top (or ceiling) and the sub screen faces the bottom.

Also, to detect where the main screen faces, the sensing unit 140 may include a motion recognition sensor (a terrestrial magnetism sensor, a gyro sensor, an acceleration sensor, etc.).

Afterwards, upon the change of the orientation of the surface (for example, the first transparent substrate 410) on which the touch input has been sensed, namely, when the sensing unit 140 has detected that the main screen is facing the reverse direction to a preset direction, then the controller 180 may recognize that the orientation in which the transparent display unit 155 is facing the user has been switched to the second transparent substrate 420.

Those methods of sensing the at least one of the motion and the rotation of the terminal body may be employed by combination or individually.

Afterwards, when an event is generated while a content is output on the first transparent substrate 410, it may be determined whether or not the at least one of the motion and the rotation of the terminal body meets a preset condition information, and then decide based on the determination result whether or not to display information related to the generated event on the second transparent substrate 420 (S130).

For example, an event may be generated when the user is viewing the first transparent substrate 410 on which the content is being output. Here, the event may indicate a variety of events received from a network or a server to the mobile terminal 100. Also, the event may include every event generated within the mobile terminal 100 or generated by the user.

When the event is generated while the content is output on the first transparent substrate 410, the controller 180 may display an object (for example, a pop-up window) on the first transparent substrate 410 to indicate the generation of the event. The pop-up window may be displayed on the first transparent substrate 410 for a preset time.

The pop-up window may automatically disappear from (not be displayed any more on) the first transparent substrate 410 after the lapse of the preset time. Also, the pop-up window may not be displayed any more on the first transparent substrate 410 when the user selects a stop icon displayed on the pop-up window. In addition, the pop-up window may not be displayed any more on the first transparent substrate 410 when the user touches the second transparent substrate 420.

However, upon the change of the orientation that the transparent display unit 155 faces the user in response to rotation of the terminal body, namely, when the user is facing the second transparent substrate 410 of the transparent display unit 155, the controller 180 may display information related to the event on the second transparent substrate 420.

For example, when the generated event is an event associated with a received text message, the pop-up window displayed on the first transparent substrate 410 may display a message indicating the reception of the text message. Afterwards, when the orientation that the transparent display unit 155 faces the user changes in response to the rotation of the terminal body, an execution screen of a text message application which includes the text (contents) of the received text message may be displayed on the second transparent substrate 420.

Here, the content may be continuously reproduced on the first transparent substrate 410. In this case, the reproduced content may be continuously output on the first transparent substrate 410.

Meanwhile, the content which is output on the first transparent substrate 410 may be paused. In this case, a paused screen of the content may be output on the first transparent substrate 410.

Also, the content output on the first transparent substrate 410 may be terminated. In this case, instead of a content output screen displayed on the first transparent substrate 410, a default screen (for example, a home screen) or a contents list may be displayed on the first transparent substrate 410.

Furthermore, the pop-up window which has been output on the first transparent substrate 410 may not be output any more simultaneously when the execution screen of the text message application is displayed on the second transparent substrate 420.

In the meantime, when the user faces the second transparent substrate 420 of the transparent display unit 155, brightness of the second transparent substrate 420 may be automatically adjusted. For example, the brightness of the second transparent substrate 420 may be adjusted to a brighter level than the current brightness level. Simultaneously, the brightness of the first transparent substrate 410 which the user does not view may also be automatically adjusted. For example, brightness of the first transparent substrate 410 may be adjusted to a darker level than the current brightness level. When the user faces the first transparent substrate 410, the brightness of each of the first and second transparent substrates 410 and 420 may be adjusted in reverse to the aforementioned ways.

The exemplary embodiments of the present disclosure may be applied to the mobile terminal 100 having the transparent display unit 155 with the first and second transparent substrates 410 and 420, and further applied even to a mobile terminal having a plurality of display units (for example, "first and second display units") 151*a* and 151*b*. Here, the first and second display units 151*a* and 151*b* may be attached to each other.

As described above, according to the present disclosure, a content output screen may be displayed on the first transparent substrate 410 of the transparent display unit 155 and information related to a generated event may be displayed on the second transparent substrate 420. This may allow a user to fully view the content output screen and the event-related information without an obscured portion.

Also, according to the present disclosure, the information related to the generated event may be displayed on the second transparent substrate 420 based on the orientation of the transparent display unit 155. That is, an entrance path for displaying the event-related information may be provided by a simplified control operation. This may facilitate the user to check the event-related information even without a complicated manipulation, resulting in improvement of the user's convenience.

Figure 7B:
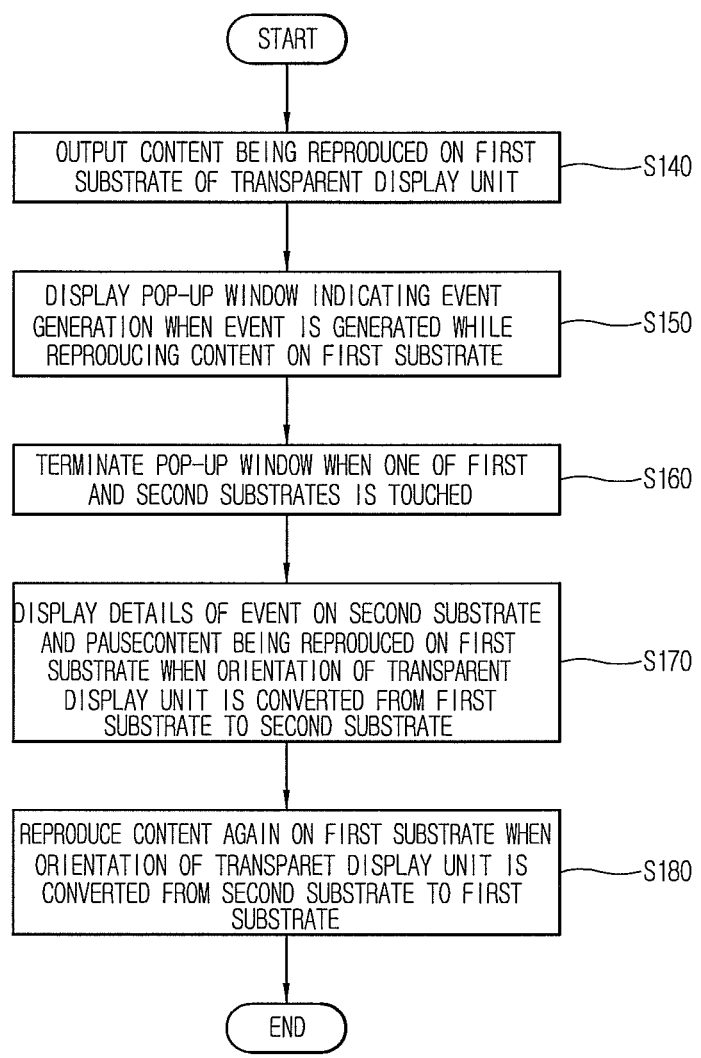
FIG. 7B is a flowchart showing a detailed exemplary embodiment of the control method for the mobile terminal according to FIG. 7A.

FIG. 7B is a flowchart showing a detailed exemplary embodiment of the control method for the mobile terminal 100 according to FIG. 7A. The mobile terminal 100 may include the transparent display unit 155 (see FIG. 1), the sensing unit 140 (see FIG. 1) and the controller 180 (see FIG. 1). Hereinafter, repetitive description with FIG. 7A will be omitted.

Referring to FIG. 7B, a content which is being reproduced is output on the first transparent substrate 410 of the transparent display unit 155 (S140). While the content is reproduced on the first transparent substrate 410, when an event is generated, a pop-up window for indicating the generation of the event may be displayed (S150).

When the event is generated while the content is output on the first transparent substrate 410, a pop-up window as an object for indicating the event generation may be displayed on at least one of the first and second transparent substrates 410 and 420. For example, the pop-up window may be displayed on the first transparent substrate 410. Meanwhile, the pop-up window may also be displayed on the second transparent substrate 420. In this case, the pop-up window displayed on the second transparent substrate 420 may be transmitted onto the first transparent substrate 410.

Next, when one of the first and second transparent substrates 410 and 420 is touched, the pop-up window displayed may be terminated (S160).

For example, the pop-up window displayed may disappear when a position on the first transparent substrate 410 or the second transparent substrate 420 is touched. As another example, the pop-up window displayed may not be displayed any more only when a stop icon displayed on the pop-up window is selected by a user.

Afterwards, when at least one of motion and rotation of the terminal body meets a preset condition information, details of the event may be output on the second transparent substrate 420 and the content which is being reproduced on the first transparent substrate may be paused (S170).

In detail, when the orientation that the transparent display unit 155 faces a user is switched, namely, when the user faces the second transparent substrate 420 of the transparent display unit 155, the controller 180 may display information relating to the event on the second transparent substrate 420.

For example, when the generated event is associated with a received text message, an execution screen of a text message application including the text of the received text message may be displayed on the second transparent substrate 420. Here, the content which is being reproduced on the first transparent substrate 410 may be paused. Accordingly, the paused screen of the content may be displayed on the first transparent substrate 410.

Next, when the orientation of the transparent display unit 155 is switched from the second transparent substrate 420 to the first transparent substrate 410 in response to the rotation of the terminal body, the content may be reproduced again on the first transparent substrate 410 (S180).

In detail, when the orientation that the transparent display unit 155 faces the user is switched, namely, when the user faces the first transparent substrate 410 of the transparent display unit 155, the controller 180 may reproduce the content again. Here, the controller 180 may reproduce the content again, starting from the paused time point. Consequently, the user may keep viewing the content from the paused time point via the first transparent substrate 410.

In the meantime, the controller 180 may reproduce the content from the beginning according to the user's setting. To this end, when the orientation of the transparent display unit 155 is switched from the second transparent substrate 420 to the first transparent substrate 410, a pop-up window may be output on the first transparent substrate 410 such that a user can select whether to reproduce the content again from the beginning or from the paused time point.

FIGS. 8 to 14 are conceptual views showing exemplary operations of the mobile terminal according to FIG. 7A. The mobile terminal 100 may include the transparent display unit 155, the sensing unit 140 (see FIG. 1) and the controller 180 (see FIG. 1). The transparent display unit 155 may include the first and second transparent substrates 410 and 420.

Figure 8:
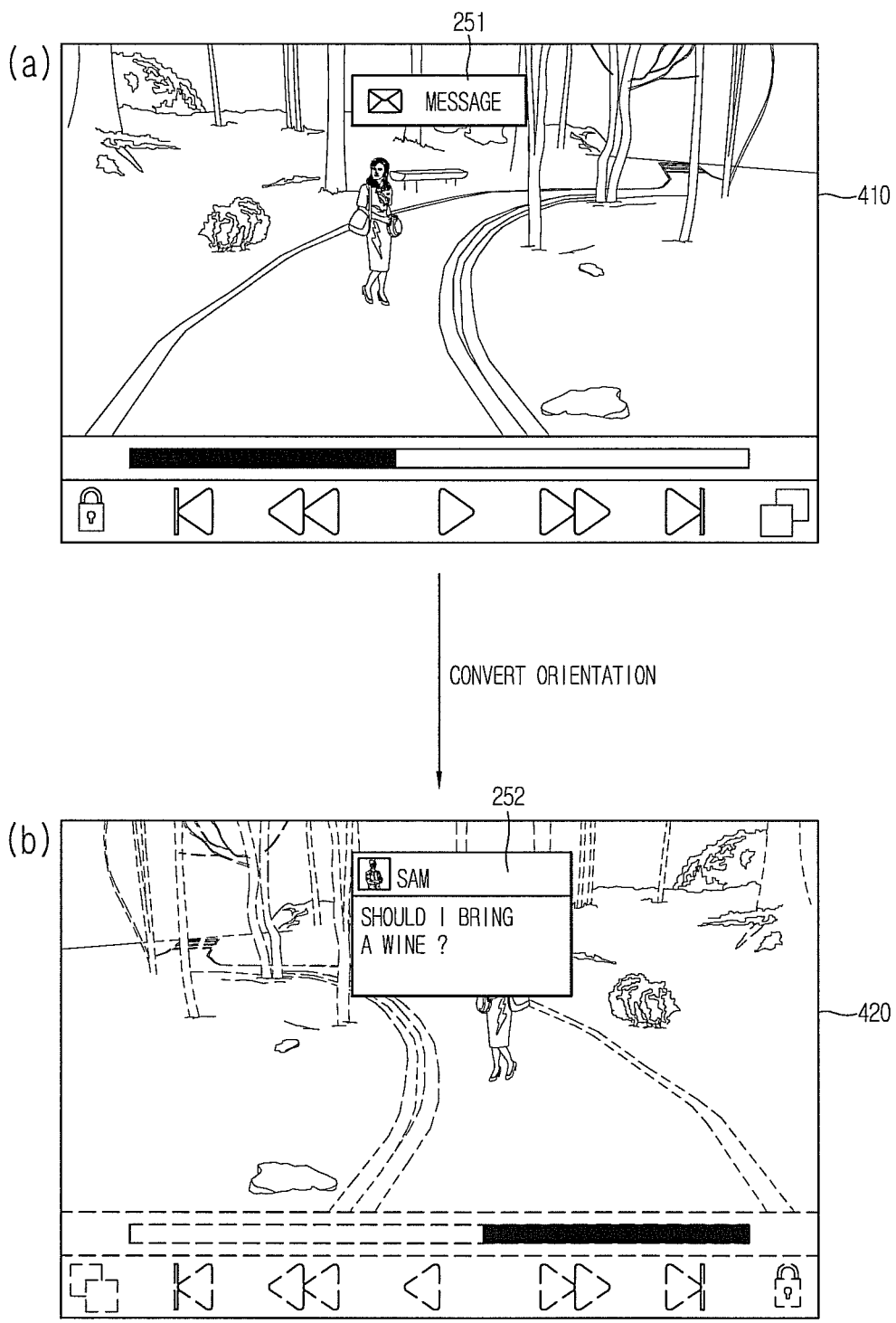
FIGS. 8 to 14 are conceptual views showing exemplary control operations of the mobile terminal according to FIG. 7A.

FIG. 8 shows a user interface in case where an orientation of the transparent display unit is switched when a pop-up window 251 associated with an event generated is displayed on the first transparent substrate 410 of the transparent display unit 155.

Referring to FIG. 8, a content may be output on the first transparent substrate 410 of the transparent display unit 155. For example, a video content may be output on the first transparent substrate 410.

FIG. 8 illustrates that a separate content is not output on the second transparent substrate 420 for convenience of explanation, but a separate content may also be output on the second transparent substrate 420. Here, the separate content output on the second transparent substrate 420 may be transmitted onto the first transparent substrate 410. That is, a left-right inversed image of the content output on the second transparent substrate 420 may be displayed on the first transparent substrate 410 together with the video content which is being output on the first transparent substrate 410.

Referring to FIG. 8(a), an event may be generated while the video content is output on the first transparent substrate 410. In response to the event generation, an object 251 indicating the event generation may be displayed on the first transparent substrate 410 together with the video content.

Here, the object 251 may include an icon, a widget, an application execution menu, a thumbnail image, a pop-up window and the like. Hereinafter, for the sake of description, the type of the object 251 will be illustrated as the pop-up window.

When the generated event is associated with a received text message, the pop-up window 251 displayed on the first transparent substrate 410 may output a message indicating the reception of the text message.

As shown, the pop-up window 251 may be displayed in an overlapping manner with the video content. The pop-up window 251 may be displayed in a non-transparent form, or displayed in a semi-transparent or transparent form such that it cannot obscure the video content.

Afterwards, as shown in FIG. 8(b), when the orientation that the transparent display unit 155 faces the user is switched, namely, when the user faces the second transparent substrate 420 of the transparent display unit 155, the controller 180 may display information relating to the received text message on the second transparent substrate 420.

Here, the video content may be continuously output on the first transparent substrate 410 or a paused image content that the video content has been paused may be output on the first transparent substrate 410. The second transparent substrate 420 may display a left-right inversed image of the video content or the paused image content output on the first transparent substrate 410. Here, a level that the left-right inversed image of the video content or the paused image content, which is being output on the first transparent substrate 410, is transmitted onto the second transparent substrate 420 may depend on transparency information set for each of the first and second transparent substrates 410 and 420.

In the meantime, a pop-up window 252 including a text of the received text message as information relating to the received text message may be displayed on the second transparent substrate 420. Although not shown, as the information relating to the received text message, an execution screen of a text message application including the text of the received text message may be displayed on the second transparent substrate 420.

As shown in FIG. 8(b), the pop-up window 252 including the text of the received text message may be displayed with overlapping the video content. The pop-up window 252 may be displayed in a non-transparent form, or displayed in a semi-transparent or transparent form such that it cannot obscure the left-right inversed image of the video content which is being output on the first transparent substrate 410.

Figure 9:
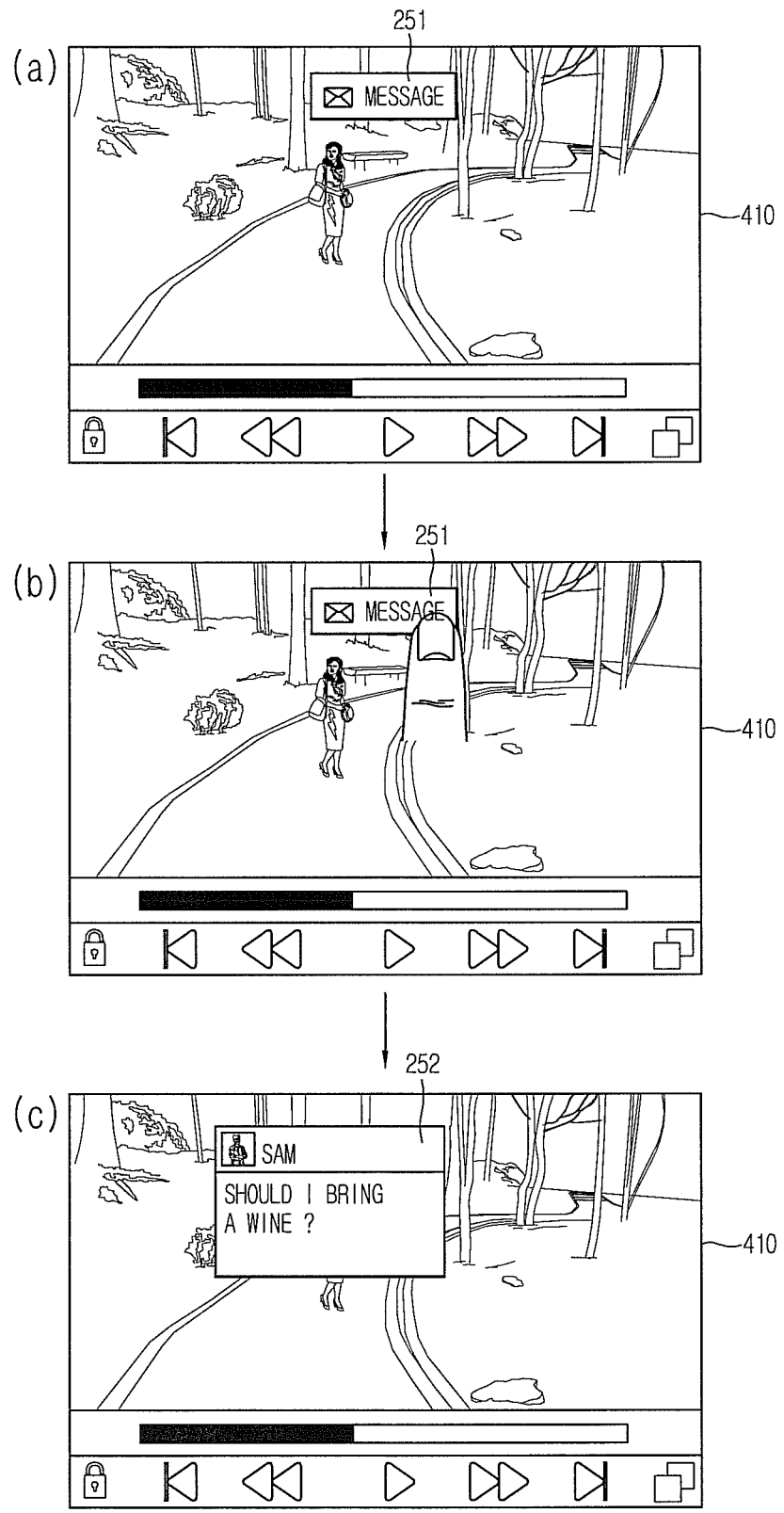

FIG. 9 shows a user interface in case where the pop-up window 251 is selected when the pop-up window 251 associated with an event generated is displayed on the first transparent substrate 410 of the transparent display unit 155.

Referring to FIG. 9(a), a text message may be received while outputting a video content on the first transparent substrate 410 of the transparent display unit 155. The controller 180 may display a pop-up window 251, which includes a message indicating the reception of the text message, on the first transparent substrate 410.

Next, referring to FIGS. 9(b) and 9(c), in response to selection of the pop-up window 251 displayed on the first transparent substrate 410, the controller 180 may display information relating to the received text message on the first transparent substrate 410.

A pop-up window 252 including a text of the received text message as information relating to the received text message may be displayed on the first transparent substrate 410. Although not shown, as the information relating to the received text message, an execution screen of a text message application including the text of the received text message may be displayed on the first transparent substrate 410.

Here, the pop-up window 252 including the text of the received text message may be displayed with overlapping the video content. The pop-up window 252 may be displayed in a non-transparent form, or displayed in a semi-transparent or transparent form such that it cannot obscure the video content.

The user may send a text message to another party by applying a touch input onto the pop-up window 252. That is, the user may send a text message directly to another party on the pop-up window 252. Or, when a text message execution screen is displayed after selecting the pop-up window 252, the user may send a text message to another party on the text message execution screen.

Figure 10:
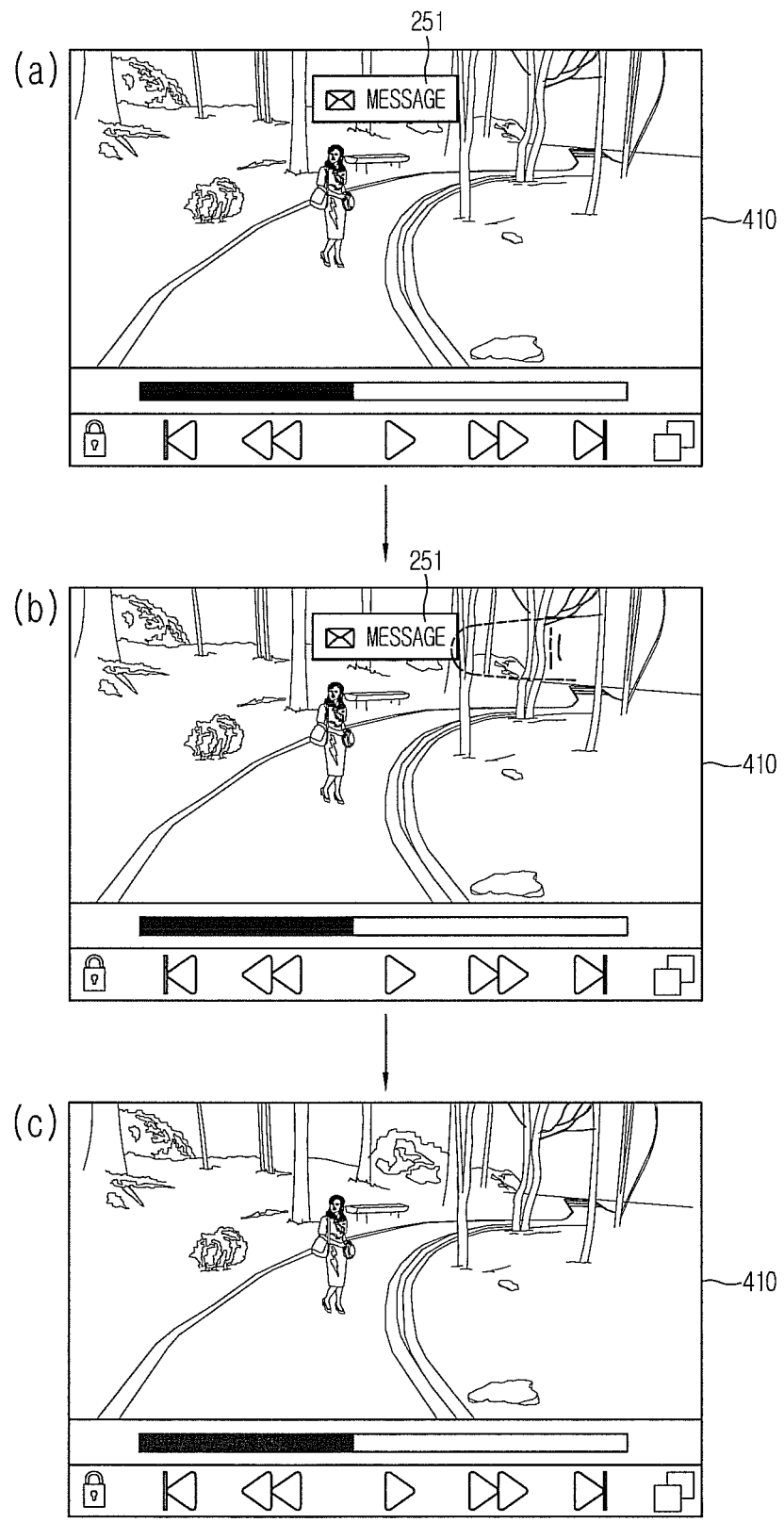
Figure 11:
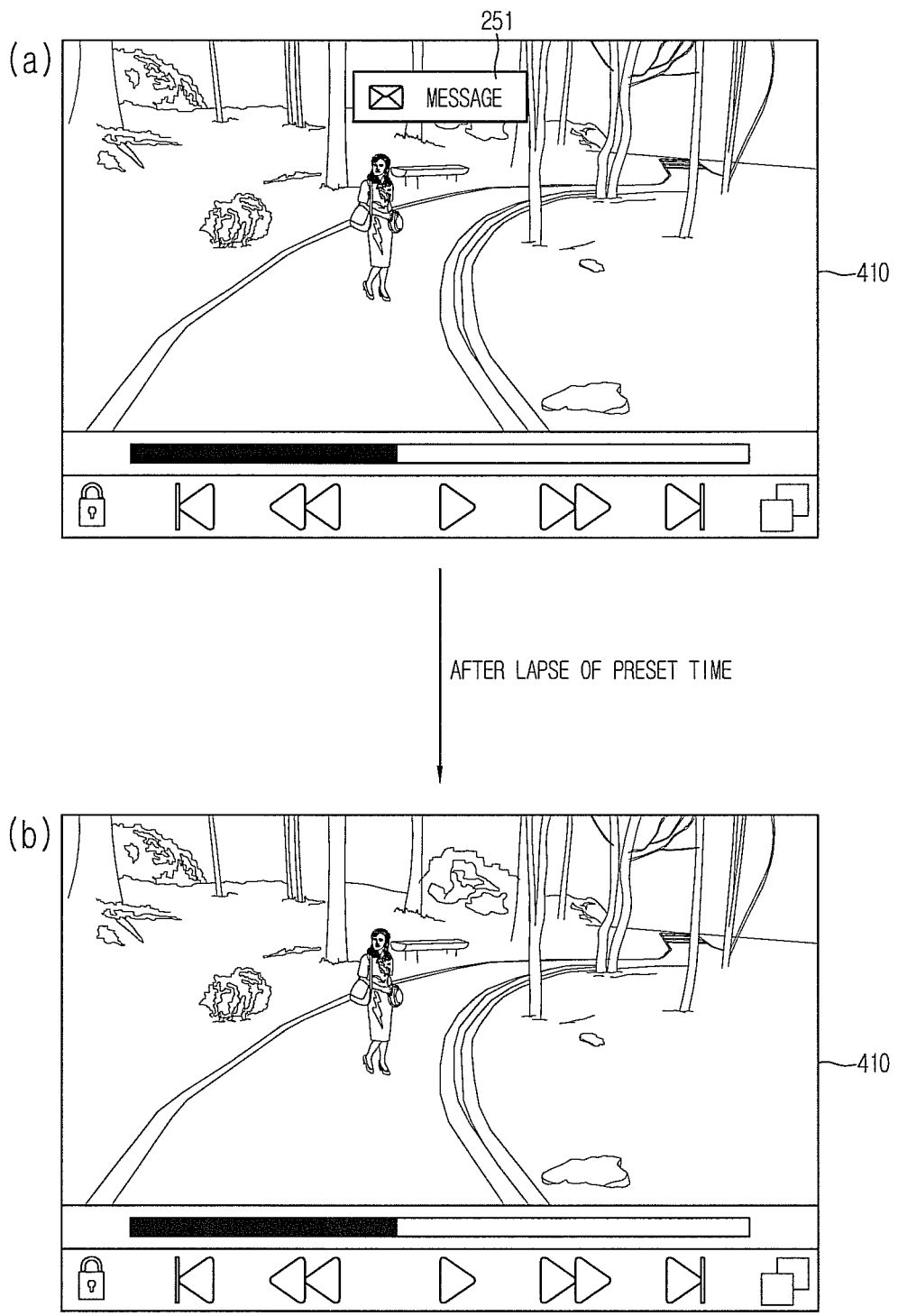

FIGS. 10 and 11 show user interfaces in case where the pop-up window 251 is not displayed any more when the pop-up window 251 associated with an event generated is displayed on the first transparent substrate 410 of the transparent display unit 155.

As shown in FIG. 10(a) and FIG. 11(a), a text message may be received while outputting a video content on the first transparent substrate 410 of the transparent display unit 155. The controller 180 may display a pop-up window 251 including a message, which indicates the reception of the text message, on the first transparent substrate 410.

Next, referring to FIGS. 10(b) and 10(c), when one position on the second transparent substrate 420 is touched, the controller 180 may control the pop-up window 251, which is displayed on the first transparent substrate 410 with including the message indicating the reception of the text message, not to be displayed any more on the first transparent substrate 410.

Here, the one position on the second transparent substrate 420 may be an arbitrary position on the second transparent substrate 420 or a position onto which the pop-up window 251 displayed on the first transparent substrate 410 is transmitted.

Referring to FIG. 11(b), when a preset time is lapsed after the pop-up window 251 is displayed on the first transparent substrate 410, then the controller 180 may control the pop-up window 251 not to be displayed on the first transparent substrate 410 anymore.

Figure 12:
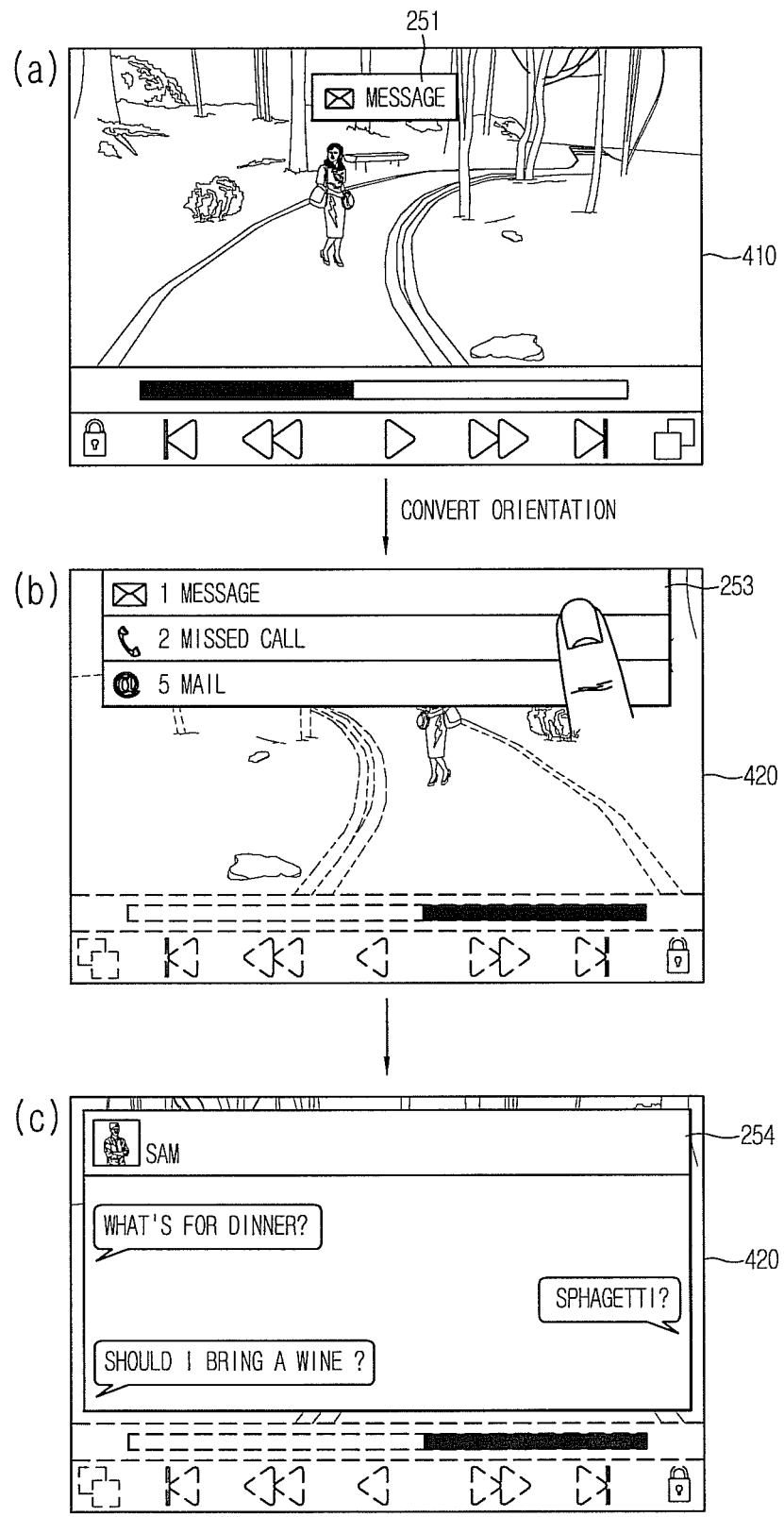

FIG. 12 shows a user interface in case where an orientation of the transparent display unit 155 is switched when the pop-up window 251 associated with an event generated is displayed on the first transparent substrate 410 of the transparent display unit 155.

Referring to FIG. 12(a), a text message may be received while outputting a video content on the first transparent substrate 410 of the transparent display unit 155. The controller 180 may display the pop-up window 251, which includes a message indicating the reception of the text message, on the first transparent substrate 410.

Next, referring to FIG. 12(b), when the orientation that the transparent display unit 155 faces a user is switched in response to rotation of the terminal body, namely, when the user faces the second transparent substrate 420 of the transparent display unit 155, the controller 180 may display an event list including generated event items on the second transparent substrate 420.

Accordingly, the second transparent substrate 420 may display not only a text message reception indicating item but also the event list including a missed call indicating item, an email reception indicating item and the like.

Here, the first transparent substrate 410 may continuously output the video content or a paused image content that the video content has been paused. The second transparent substrate 420 may display a left-right inversed image of the video content or the paused image content output on the first transparent substrate 410.

Here, when at least one of the event items included in the event list is selected, referring to FIG. 12(c), the controller 180 may display information relating to an event corresponding to the selected event item on the second transparent substrate 420.

For example, when the text message reception indicating item 253 is selected from the event items included in the event list, the controller 180 may display an execution screen 254 of a text message application, which includes the text of the received text message, on the second transparent substrate 420. The execution screen 254 of the text message application may be displayed as a full screen on the second transparent substrate 420 or displayed on a partial area of the second transparent substrate 420. The user may send a text message to another party on the execution screen 254 of the text message application.

While such operation is executed, the video content or the paused image of the content that the video content has been paused may be continuously output on the first transparent substrate 410.

Figure 13:
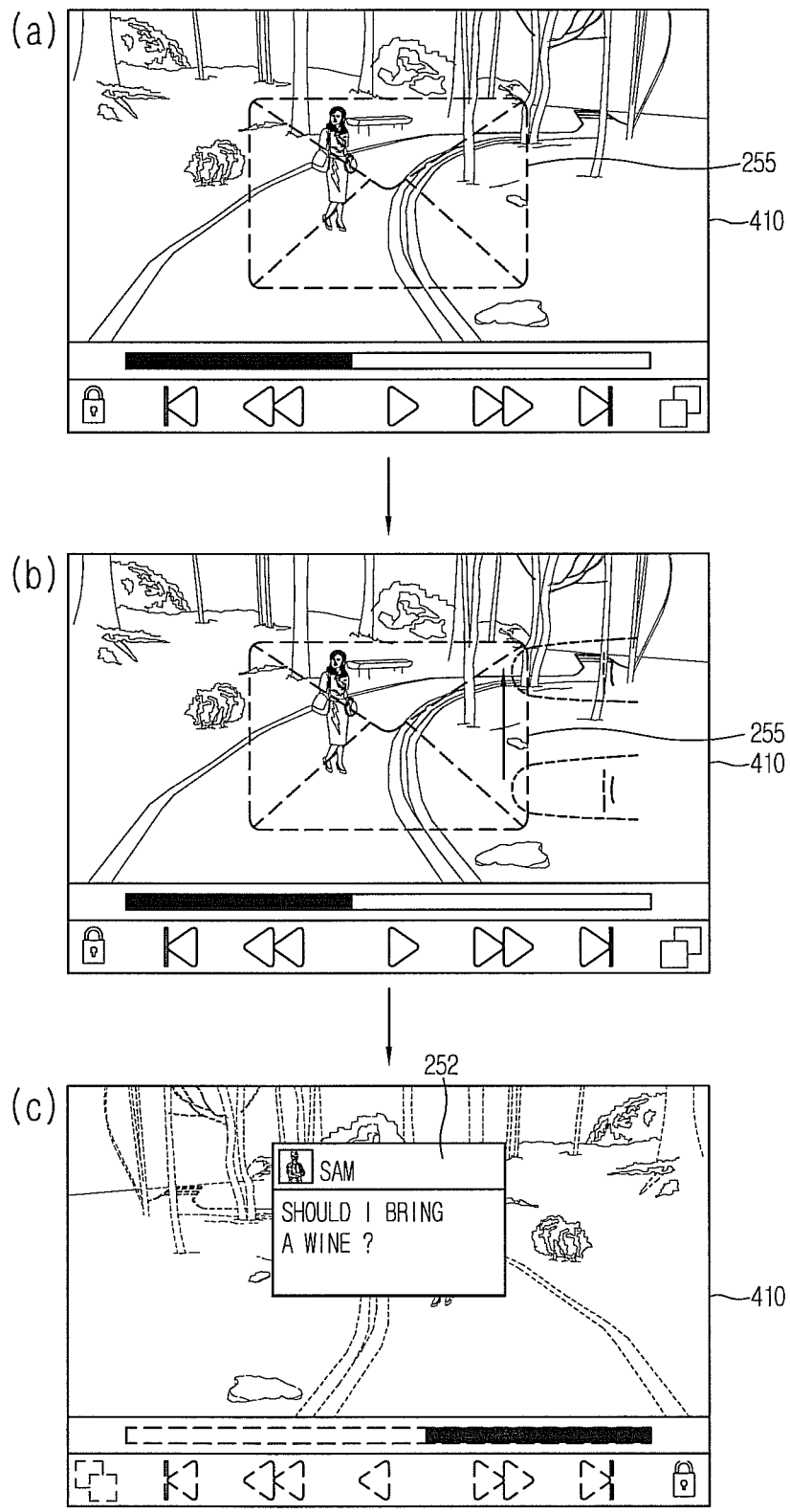
Figure 14:
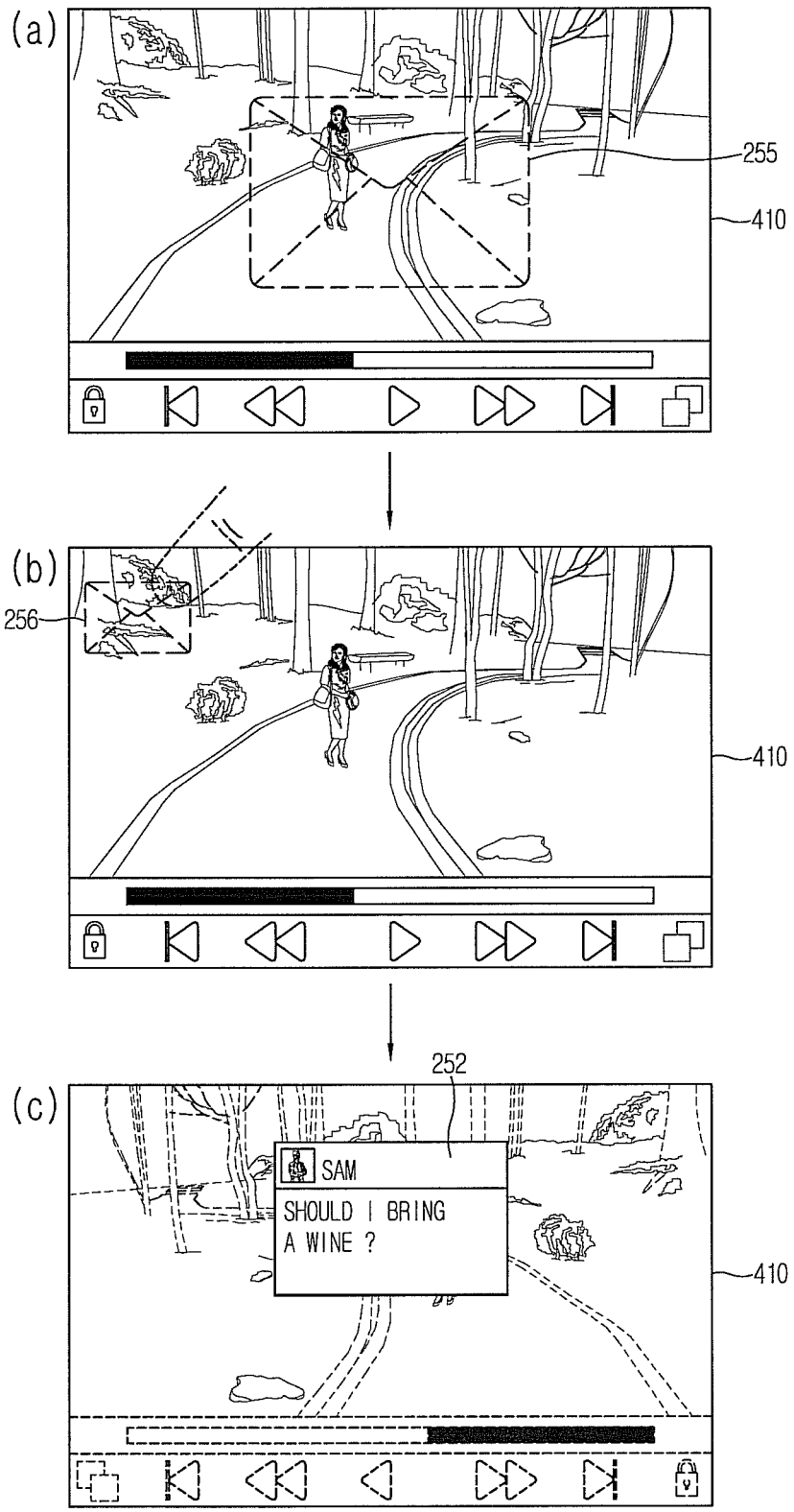

FIGS. 13 and 14 show user interfaces in case where an object 255 associated with a generated event is displayed on the second transparent substrate 420 of the transparent display unit 155.

As shown in FIG. 13(a), a text message may be received while outputting a video content on the first transparent substrate 410 of the transparent display unit 155. The controller 180 may display an object 255 (hereinafter, referred to as "text message icon"), which indicates the reception of the text message, on the second transparent substrate 420 other than the first transparent substrate 410.

A left-right inversed image of the text message icon 255 displayed on the second transparent substrate 420 may be transmitted onto the first transparent substrate 410. Here, a level that the left-right inversed image of the text message icon 255 output on the second transparent substrate 420 is transmitted onto the first transparent substrate 410 may depend on transparency information set for each of the first and second transparent substrates 410 and 420.

Referring to FIGS. 13(b) and 13(c), when a touch input is sensed on one position of the second transparent substrate 420, for example, a position where the text message icon 255 is displayed on the second transparent substrate 420, then the controller 180 may display information relating to the generated event on the first transparent substrate 410.

For example, when a user drags upwardly the object 255 displayed on the second transparent substrate 420, the controller 180 may display a pop-up window 252, which includes a text of the received text message, on the first transparent substrate 410. Although not shown, the controller 180 may display an execution screen of a text message application including the text of the received text message on the first transparent substrate 410.

Simultaneously, the controller 180 may also output a video content, which is being output on the first transparent substrate 410, on the second transparent substrate 420. Accordingly, the video content output on the second transparent substrate 420 may be transmitted onto the first transparent substrate 410.

Referring to FIG. 14(a), after the lapse of a preset time in a state that an object 255 (hereinafter, referred to as "first icon") indicating the reception of the text message is displayed on the second transparent substrate 420, the controller 180 may control the first icon 255 not to be displayed any more on the second transparent substrate 420, and, as shown in FIG. 14(b), display on the second transparent substrate 420 an object 256 (hereinafter, referred to as "second icon") which indicates presence of an unchecked text message among previously received text messages.

As shown, the first icon 255 and the second icon 256 may be displayed on different positions of the second transparent substrate 420 with different sizes. For example, the first icon 255 may be displayed on a central region of the second transparent substrate 420 to indicate that a text message has received just before. After the lapse of a preset time, the second icon 256 may be displayed on an edge region of the second transparent substrate 420 in a smaller size than the first icon 255 to indicate that there is an unchecked text message among previously received text messages (received earlier than "just before").

Although not shown, the first icon 255 and the second icon 256 may be different from each other in at least one of a shape, color, edge thickness, transparency and three-dimensional (3D) depth value.

Afterwards, when a touch input is sensed on the second icon 256 displayed on the second transparent substrate 420, the controller 180 may display a pop-up window 252, which includes information relating to an event generated, for example, the text of the received text message, on the first transparent substrate 410.

Similarly, the controller 180 may simultaneously output a video content, which is being output on the first transparent substrate 410, on the second transparent substrate 420. Accordingly, the video content output on the second transparent substrate 420 may be transmitted onto the first transparent substrate 410.

Figure 15:
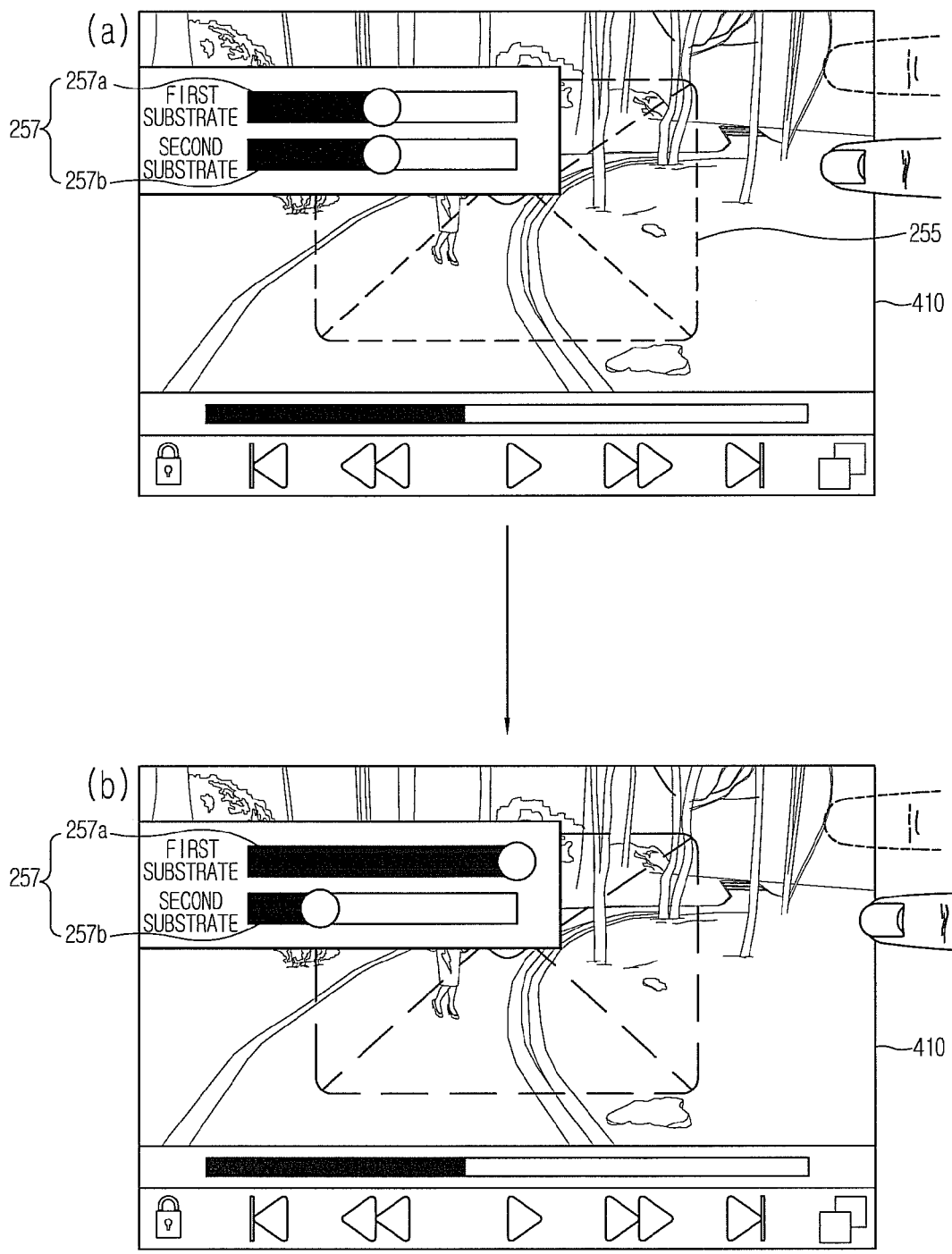
FIGS. 15 and 16 are conceptual views showing user interfaces for adjusting transparency of a transparent display unit in the mobile terminal according to FIG. 7A.
Figure 16:
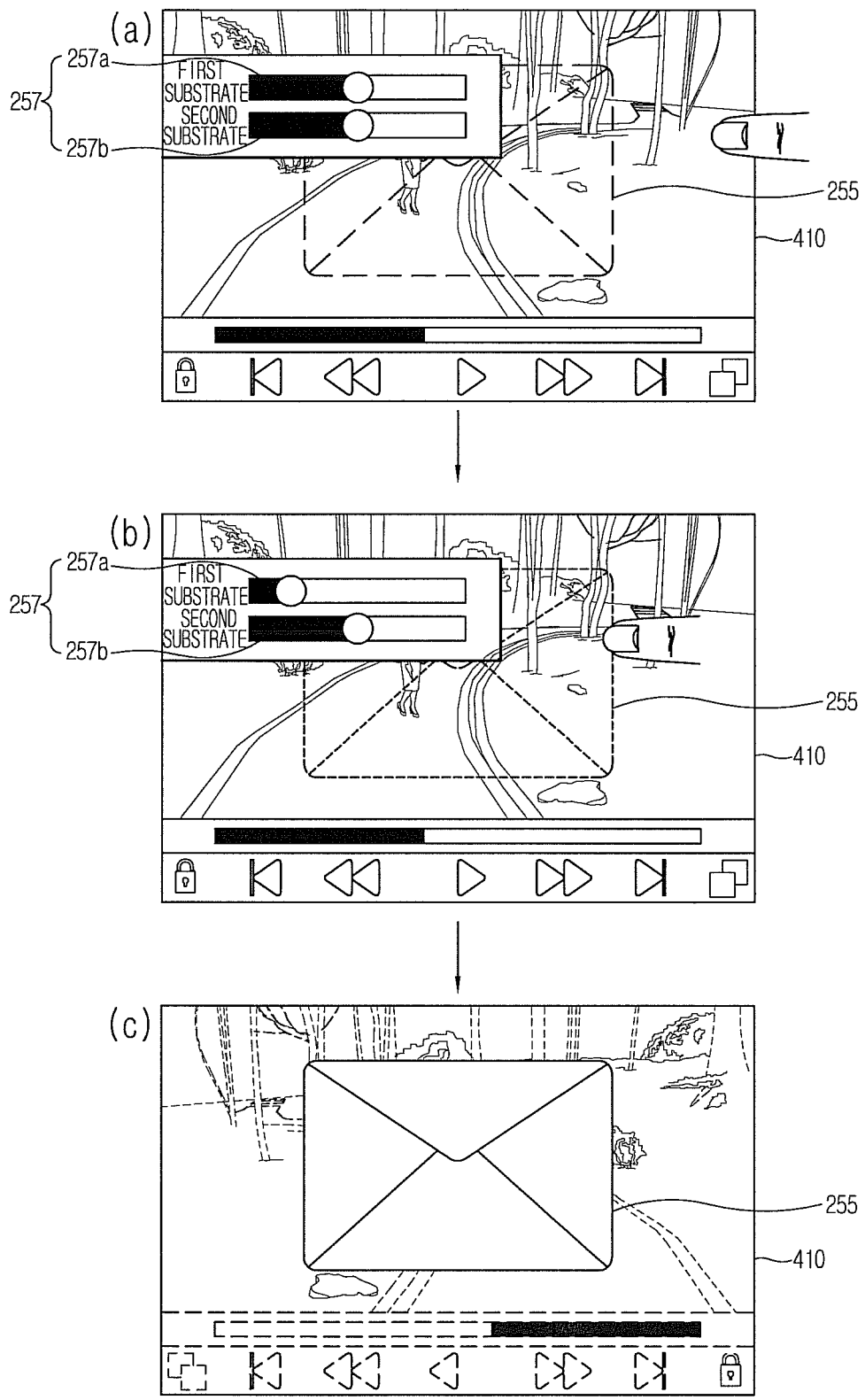

FIGS. 15 and 16 are conceptual views showing user interfaces for adjusting transparency of the transparent display unit 155 in the mobile terminal 100 according to FIGS. 7A and 7B. The mobile terminal 100 may include the transparent display unit 155, the sensing unit 140 (see FIG. 1) and the controller 180 (see FIG. 1). The transparent display unit 155 may include the first and second transparent substrates 410 and 420.

Referring to FIG. 15(a), a video content may be output on the first transparent substrate 410 of the transparent display unit 155. The controller 180 may sense a touch input applied onto the transparent display unit 155 to adjust transparency of the transparent display unit 155.

For example, the controller 180 may generate a control command for adjusting the transparency of at least one of the first and second transparent substrates 410 and 420 only when touch inputs are sensed simultaneously on the first and second transparent substrates 410 and 420 of the transparent display unit 155.

As shown in FIG. 15(b), when touch inputs (hereinafter, referred to as "first and second touch inputs") are sensed simultaneously on the first and second transparent substrates 410 and 420 of the transparent display unit 155, the controller 180 may adjust the transparency of the respective first and second transparent substrates 410 and 420 based on attribute information relating to each of the sensed first and second touch inputs.

In detail, the controller 180 may adjust the transparency of the first transparent substrate 410 based on at least one of direction information and length information both relating to the first touch input. Similarly, the controller 180 may adjust the transparency of the second transparent substrate 420 based on at least one of direction information and length information both relating to the second touch input.

For example, when the first touch input sensed on the first transparent substrate 410 is a drag input dragged from left to right sides, the controller 180 may lower the transparency of the first transparent substrate 410 based on the length of the drag input. That is, the controller 180 may increase non-transparency of the first transparent substrate 410 such that a content displayed on the second transparent substrate 420 cannot be transmitted onto the first transparent substrate 410.

Also, when the second touch input sensed on the second transparent substrate 420 is a drag input dragged from right to left sides, the controller 180 may increase the transparency of the second transparent substrate 420 based on the length of the drag input. That is, the controller 180 may increase the transparency of the second transparent substrate 420 such that an image content displayed on the first transparent substrate 410 can fully be transmitted onto the second transparency substrate 420.

In the meantime, referring to FIG. 15(a), the controller 180 may display on the transparent display unit 155 indicator bars 257 (hereinafter, referred to as "first and second indicator bars"), which indicate transparency information relating to each of the first and second transparent substrates 410 and 420.

Still referring to FIG. 15(a), the first and second indicator bars 257a and 257b may be displayed in an overlapping manner with the video content. The first and second indicator bars 257a and 257b may be displayed in a non-transparent form, or displayed in a semi-transparent or transparent form such that they cannot obscure the video content. Also, the transparency of each of the first and second indicator bars 257a and 257b may be adjusted based on a user's touch input.

Here, the controller 180 may decide, based on an orientation of the transparent display unit 155, which one of the first transparent substrate 410 and the second transparent substrate 420 is used to display the indicator bars 257a and 257b.

For example, when the user is facing the first transparent substrate 410, the controller 180 may display the first and second indicator bars 257a and 257b on the first transparent substrate 410. Although not shown, when the user is facing the second transparent substrate 420, the controller 180 may display the first and second indicator bars 257a and 257b on the second transparent substrate 420.

Although not shown, the controller 180 may always display the first indicator bar 257a on the first transparent substrate 410 and the second indicator bar 257b on the second transparent substrate 420, irrespective of the orientation of the transparent display unit 155.

Meanwhile, the user may adjust the transparency of each of the first and second transparent substrates 410 and 420 by use of first and second touch inputs applied onto the first and second transparent substrates 410 and 420, respectively. Or, the user may adjust the transparency of each of the first and second transparent substrates 410 and 420 by use of first and second touch inputs applied onto the first and second indicator bars 257a and 257b, respectively.

Referring to FIG. 16(a), the controller 180 may first simultaneously sense touch inputs applied on the first and second transparent substrates 410 and 420 of the transparent display unit 155, and adjust the transparency of one of the first and second transparent substrates 410 and 420 based on the touch input sensed on the corresponding one substrate.

The touch inputs applied on the first and second transparent substrates 410 and 420 of the transparent display unit 155 may not always have to be sensed simultaneously in order to generate a control command for transparency adjustment. Even though a touch input is sensed on only one of the first and second transparent substrates 410 and 420, the controller 180 may generate a control command for adjusting the transparency of the one substrate with the touch input sensed thereon.

Referring to FIG. 16(b), the controller 180 may adjust the transparency of the first transparent substrate 410 based on at least one of direction information and length information relating to a touch input sensed on the first transparent substrate 410.

For example, when a first touch input sensed on the first transparent substrate 410 is a drag input dragged from right to left sides, the controller 180 may increase the transparency of the first transparent substrate 410 based on the length of the drag input. That is, the controller 180 may increase the transparency of the first transparent substrate 410 such that a content displayed on the second transparent substrate 420 can be fully transmitted onto the first transparent substrate 410.

Referring to FIG. 16(c), when the length of the touch input sensed on the first transparent substrate 410 is more than a preset length, the controller 180 may switch screens, which are displayed respectively on the first and second transparent substrates 410 and 420, with each other.

For example, when the dragged length of the drag input sensed on the first transparent substrate 410 is more than a preset length, the controller 180 may display a content output screen, which has been displayed on the first transparent substrate 410, on the second transparent substrate 420, and an object 255, which has been displayed on the second transparent substrate 420, on the first transparent substrate 410.

Accordingly, the object 255 may be displayed on the first transparent substrate 410, and a left-right inversed image of the output image content may be displayed on the second transparent substrate 420 by being transmitted thereonto.

Figure 17:
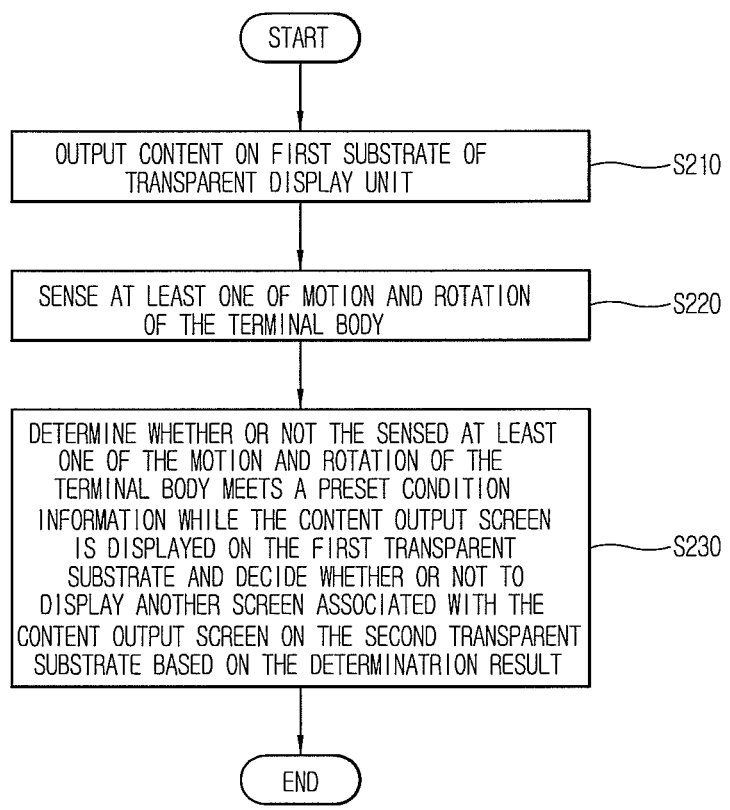
FIG. 17 is a flowchart showing another exemplary embodiment of a control method for a mobile terminal according to the present disclosure.

FIG. 17 is a flowchart showing another exemplary embodiment of a control method for a mobile terminal 100 (see FIG. 1) according to the present disclosure. The mobile terminal may include the transparent display unit 155 (see FIG. 1), the sensing unit 140 (see FIG. 1) and the controller 180 (see FIG. 1).

Referring to FIG. 17, a content may be output on the first transparent substrate 410 of the transparent display unit 155 (S210).

As aforementioned, the transparent display unit 155 may include the first and second transparent substrates 410 and 420. The first and second transparent substrates 410 and 420 may display contents thereon.

Next, at least one of motion and rotation of a terminal body may be sensed (S220).

As aforementioned, the sensing unit 140 may include at least one of an eye detector (not shown) and a motion recognition sensor (not shown). The eye detector and the motion recognition sensor may cooperatively work to sense at least one of motion and rotation of a terminal body, or only one of the eye detector and the motion recognition sensor may operate to sense the at least one of the motion and the rotation of the terminal body.

Afterwards, with a content output screen displayed on the first transparent substrate 410, it may be determined whether or not the at least one of the motion and the rotation of the terminal body meets a preset condition information, and decide based on the determination result whether or not to display another screen associated with the content output screen on the second transparent substrate 420 (S230).

For example, the content output screen may be displayed on the first transparent substrate 410 when the user is facing the first transparent substrate 410 on which the content is being output.

However, when the orientation that the transparent display unit 155 faces the user is switched in response to the rotation of the terminal body, namely, when the user is facing the second transparent substrate 420 of the transparent display unit 155, the controller 180 may display another screen associated with the content output screen on the second transparent substrate 420.

Here, the another screen displayed on the second transparent substrate 420 may include at least one of a detailed information display screen for a content, a content setting screen and a content edit screen.

Accordingly, the user may check detailed information relating to the content on the detailed information display screen displayed on the second transparent substrate 420. Also, the user may change settings associated with the content on the content setting screen displayed on the second transparent substrate 420. The user may also edit the content on the content edit screen displayed on the second transparent substrate 420.

When the setting associated with the content changes on the content setting screen displayed on the second transparent substrate 420, the controller 180 may apply the changed information to the content output screen displayed on the first transparent substrate 410. Also, when the content is edited on the content edit screen displayed on the second transparent substrate 420, the controller 180 may apply the changed information to the content output screen displayed on the first transparent substrate 410.

FIGS. 18 to 23 are conceptual views showing exemplary control operations of the mobile terminal 100 according to FIG. 17. The mobile terminal 100 may include the transparent display unit 155 (see FIG. 1), the sensing unit 140 (see FIG. 1) and the controller 180 (see FIG. 1). The transparent display unit 155 may include the first and second transparent substrates 410 and 420.

Figure 18:
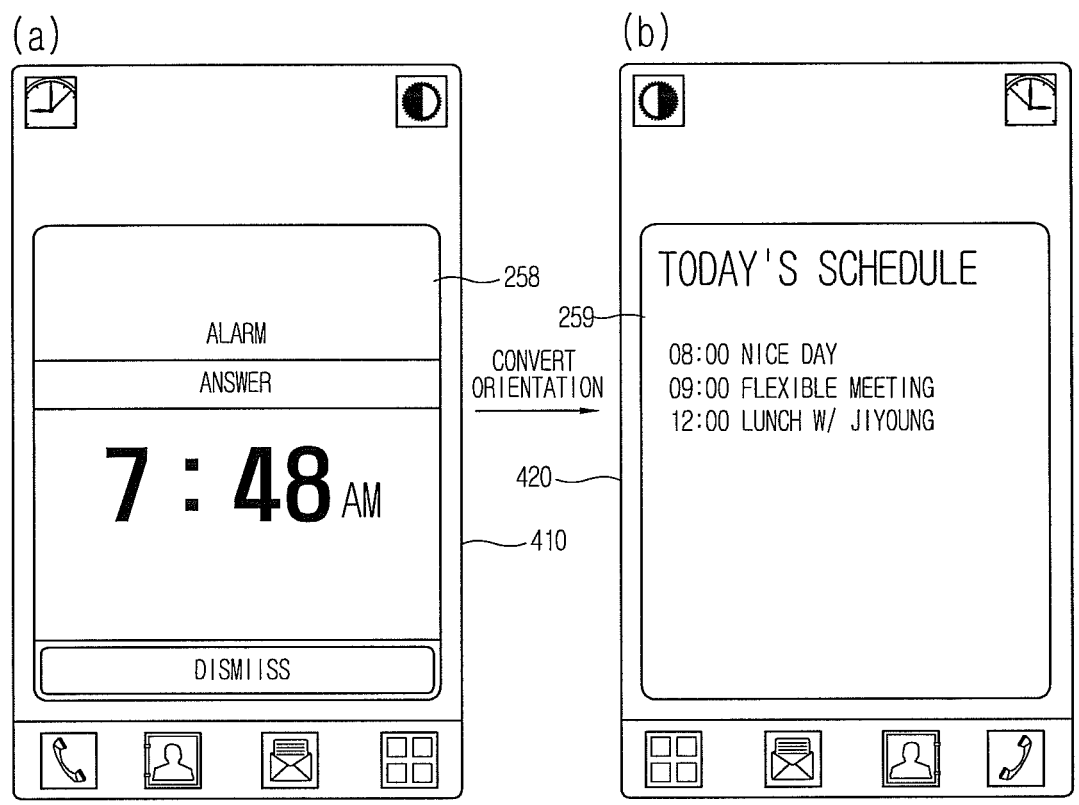

FIG. 18 shows a user interface in case where a content indicating an alarm time (hereinafter, referred to as "alarm content") 258 is displayed on the first transparent substrate 410.

Referring to FIG. 18(a), when a preset alarm time comes, an alarm sound may be output via the audio output module 152 (see FIG. 1). Or, as shown, the alarm content 258 may be displayed on the first transparent substrate 410 of the transparent display unit 155.

The sensing unit 140 may include a light sensor disposed on at least one of the first and second transparent substrates 410 and 420. For example, when the mobile terminal 100 is laid on a floor, the sensing unit 140 may detect using the light sensor that the first transparent substrate 410 faces the top (or ceiling) and the second transparent substrate 420 faces the bottom.

That is, while the user is facing the first transparent substrate 410 of the transparent display unit 155, the controller 180 may display the alarm content 258 on the first transparent substrate 410.

Here, referring to FIG. 18(b), when the orientation of the transparent display unit 155 is switched in response to rotation of a terminal body, the sensing unit 140 may detect using the light sensor that the first transparent substrate 410 faces the bottom and the second transparent substrate 420 faces the top. As such, when the user is facing the second transparent substrate 420 of the transparent display unit 155, the controller 180 may display another screen associated with a content output screen on the second transparent substrate 420.

For example, as shown in FIG. 18(b), detailed information 259 relating to the alarm content 258 may be displayed on the second transparent substrate 420. As the detailed information 259 relating to the alarm content 258, user's schedule information of the day may be displayed. Although not shown, a set alarm time, an alarm name, an alarm repetitive count, an alarm sound and the like may also be displayed as the detailed information 259 relating to the alarm content 258.

Figure 19:
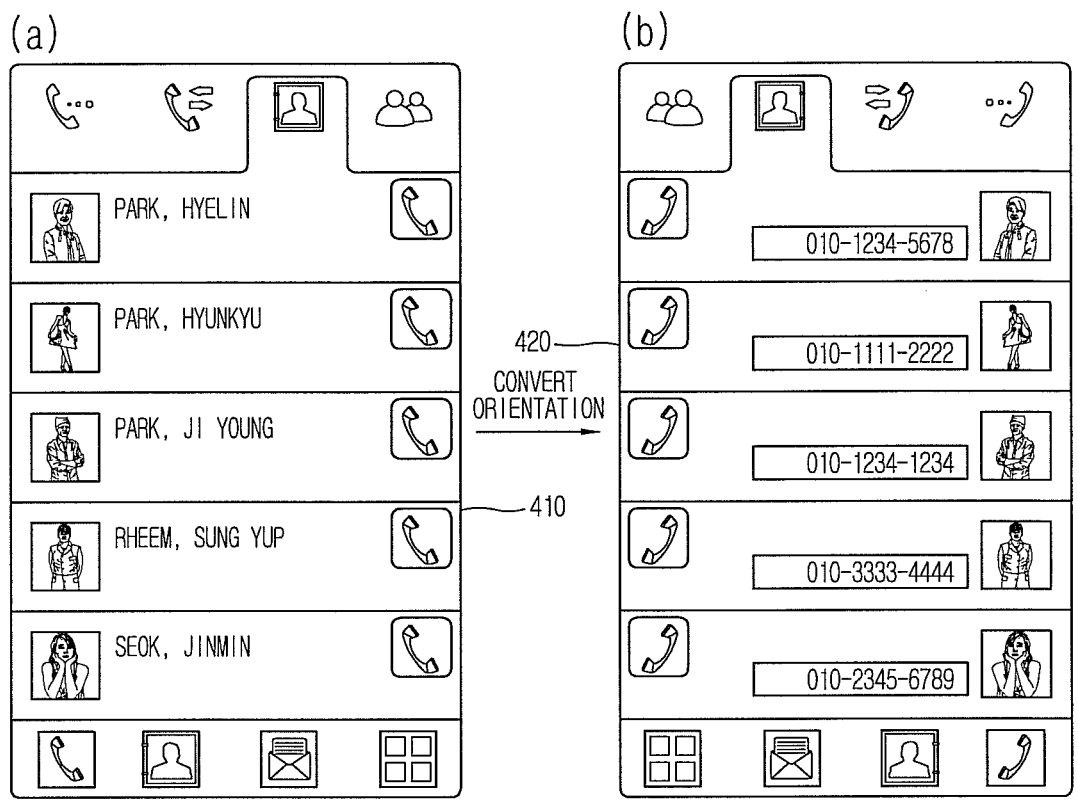

FIG. 19 shows a user interface in case where a contact item content (hereinafter, referred to as "contact content") is displayed on the first transparent substrate 410.

Referring to FIG. 19(a), a contact content may be displayed on the first transparent substrate 410 of the transparent display unit 155. That is, while the user is facing the first transparent substrate 410 of the transparent display unit 155, the controller 180 may display the contact content on the first transparent substrate 410. As shown, the contact content may include names and images of a plurality of third parties, respectively.

Here, referring to FIG. 19(b), when the orientation of the transparent display unit 155 is switched in response to rotation of a terminal body, namely, when the user is facing the second transparent substrate 420 of the transparent display unit 155, the controller 180 may display, as another screen associated with a content output screen, detailed information relating to the contact content on the second transparent substrate 420.

As the detailed information relating to the contact content, contact information relating to each third party (for example, a phone number, an email address, etc.) may be displayed.

Although not shown, when a touch input is sensed on the second transparent substrate 420, the controller 180 may execute an edit mode for the contact content. That is, an edit screen for the contact content may be displayed on the second transparent substrate 420. Or the contact content may be editable directly on the detailed information display screen displayed on the second transparent substrate 420.

Accordingly, the user may edit the phone number or email address of a third party on the second transparent substrate 420. Although not shown, the user may edit the third party's name or image on the second transparent substrate 420 as well.

Although not shown, when a scroll input is sensed on the first transparent substrate 410, the controller 180 may maintain a screen displayed on the second transparent substrate 420 as it is, with scrolling a screen displayed on the first transparent substrate 410. Similarly, even when the scroll input is sensed on the second transparent substrate 420, the controller 180 may scroll only the screen displayed on the second transparent substrate 420.

On the contrary, when the scroll input is sensed on the first transparent substrate 410, the controller 180 may scroll both the first and second transparent substrates 410 and 420 at the same time. Similarly, even when the scroll input is sensed on the second transparent substrate 420, the controller 180 may also scroll both the first and second transparent substrates 410 and 420 at the same time.

FIG. 20 shows a user interface in case where a calendar content is displayed on the first transparent substrate 410.

Referring to FIG. 20(a), the calendar content may be displayed on the first transparent substrate 410 of the transparent display unit 155. That is, while the user is facing the first transparent substrate 410 of the transparent display unit 155, the controller 180 may display the calendar content on the first transparent substrate 410. As shown, the calendar content may include day items. A day item corresponding to a scheduled day may be provided with a separate identification item.

Here, referring to FIG. 20(b), when the orientation of the transparent display unit 155 is switched in response to rotation of a terminal body, namely, when the user is facing the second transparent substrate 420 of the transparent display unit 155, the controller 180 may display, as another screen associated with a content output screen, detailed information relating to the calendar content on the second transparent substrate 420.

As the detailed information relating to the calendar content, schedule information corresponding to each day item may be displayed.

Here, when a touch input is sensed on the second transparent substrate 420, the controller 180 may execute an edit mode for the calendar content. As shown, the second transparent substrate 420 may display left-right inversed images of the day items displayed on the first transparent substrate 410.

When a touch input is sensed on one (for example, $21^{st}$ day) of the day items, which are displayed by being transmitted onto the second transparent substrate 420, as shown in FIG. 20(c), the controller 180 may execute a schedule edit mode corresponding to "$21^{st}$ day."

As the schedule edit mode is executed, a pop-up window 261 for receiving a schedule corresponding to "$21^{st}$ day" may be displayed on the second transparent substrate 420. When the user inputs the schedule corresponding to "$21^{st}$ day," the controller 180 may apply the input schedule to the calendar content output screen displayed on the first transparent substrate 410.

Accordingly, as shown in FIG. 20(*d*), a separate identification item 262 may be displayed on the day item corresponding to "21$^{st}$ day" on the first transparent substrate 410.

FIG. 21 shows a user interface in case where an image content is displayed on the first transparent substrate 410.

Referring to FIG. 21(*a*), the image content may be displayed on the first transparent substrate 410 of the transparent display unit 155. That is, while the user is facing the first transparent substrate 410 of the transparent display unit 155, the controller 180 may display the image content on the first transparent substrate 410.

Here, referring to FIG. 21(*b*), when the orientation of the transparent display unit 155 is switched in response to rotation of a terminal body, namely, when the user is facing the second transparent substrate 420 of the transparent display unit 155, the controller 180 may display, as another screen associated with the content output screen, an image content list on the second transparent substrate 420.

In response to selection of one (e.g., 264) of a plurality of image content items included in the image content list displayed on the second transparent substrate 420, the controller 180 may display an image content 265 corresponding to the selected image content item 264 on the first transparent substrate 410.

Figure 22:
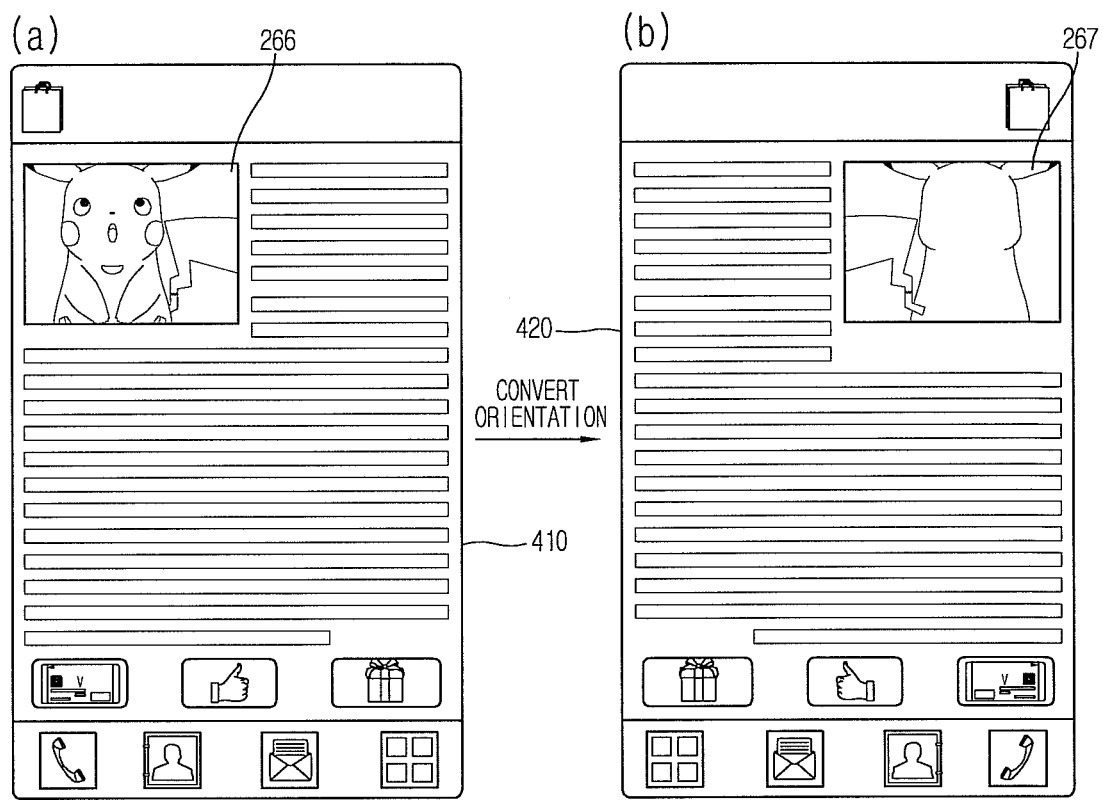

FIG. 22 shows a user interface in case where an image content is displayed on the first transparent substrate 410.

Referring to FIG. 22(*a*), an image content may be displayed on the first transparent substrate 410 of the transparent display unit 155. That is, while the user is facing the first transparent substrate 410 of the transparent display unit 155, the controller 180 may display a webpage including the image content or an execution screen of an application including the image content on the first transparent substrate 410.

The image content displayed on the first transparent substrate 410 may be an image showing one surface of an object to be captured.

Here, referring to FIG. 22(*b*), when the orientation of the transparent display unit 155 is switched in response to rotation of a terminal body, namely, when the user is facing the second transparent substrate 420 of the transparent display unit 155, the controller 180 may display, as another screen associated with a content output screen, an image showing the other surface, which is opposite to the one surface of the object to be captured, on the second transparent substrate 420.

Accordingly, the user may view the images showing each of the one surface and the other surface of the object via the first and second transparent substrates 410 and 420.

FIG. 23 shows a user interface in case where a page of an electronic document is displayed on the first transparent substrate 410.

Referring to FIG. 23(*a*), while the user is facing the first transparent substrate 410 of the transparent display unit 155, the controller 180 may display a predetermined page of an electronic document on the first transparent substrate 410.

The representative of the electronic document may include an electronic book. The electronic book may include multimedia information such as sound or image as well as text.

While the predetermined page of the electronic document is displayed on the first transparent substrate 410, when the orientation of the transparent display unit 155 is switched in response to rotation of a terminal body, namely, when the user is facing the second transparent substrate 420 of the transparent display unit 155, the controller 180 may display, as another screen associated with a content output screen, one of a previous page and the next page of the predetermined page on the second transparent substrate 420.

To this end, the sensing unit 140 may sense a rotated direction of the terminal body. The sensing unit 140 may include at least one of a terrestrial magnetism sensor, a gyro sensor and an acceleration sensor. Accordingly, the sensing unit 140 may sense whether or not the terminal body rotates. The sensing unit 140 may detect displacement according to the rotation of the terminal body, namely, a rotated direction and a rotated angle, using at least one of those sensors. The sensing unit 140 may generate a different control command depending on the rotated direction of the terminal body.

In detail, as shown in FIG. 23(*b*), when the orientation of the transparent display unit 155 is switched in response to the terminal body being rotated in a first direction, the controller 180 may display, as another screen associated with a content output screen, the previous page of the predetermined page, which has been displayed on the first transparent substrate 410, on the second transparent substrate 420.

On the contrary, as shown in FIG. 23(*c*), when the orientation of the transparent display unit 155 is switched in response to the terminal body being in a second direction, the controller 180 may display the next page of the predetermined page, which has been displayed on the first transparent substrate 410, on the second transparent substrate 420.

Accordingly, the user may view the different page on the second transparent substrate 420 according to the rotation of the terminal body in the first direction or the second direction.

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a terminal body;
    a transparent display unit having a first transparent substrate configured to sense a touch input and a second transparent substrate configured to sense a touch input;
    a sensing unit to sense one of a motion of the terminal body or a rotation of the terminal body; and
    a controller to:
        display a content on the first transparent substrate;
        detect an event in a state where the content is displayed on the first transparent substrate;
        display an object indicating the event on the first transparent substrate when the event is detected, wherein the object is displayed on the first transparent substrate together with the content;
        determine whether the sensed one of the motion or the rotation of the terminal body satisfies a preset condition after the object is displayed on the first transparent substrate; and
        display, on the second transparent substrate, information relating to the event together with an inversed image of the content on the second transparent substrate based on the preset condition being satisfied, wherein when the information related to the event is displayed on the second transparent substrate, the object, which was previously displayed on the first transparent substrate, disappears from the first transparent substrate.

2. The mobile terminal of claim 1, wherein the controller adjusts brightness of the second transparent substrate when the sensed one of the motion or the rotation of the terminal body satisfies the preset condition.

3. The mobile terminal of claim 1, wherein the controller controls the object to be removed from the first transparent substrate when a touch input is sensed on the second transparent substrate.

4. The mobile terminal of claim 1, wherein while the content is displayed on the first transparent substrate, the controller displays, on the second transparent substrate, an event list that includes a plurality of event items related to the event when the sensed one of the motion or the rotation of the terminal body satisfies the preset condition.

5. The mobile terminal of claim 4, wherein the controller displays, on the second transparent substrate, information relating to the event corresponding to an event item when the corresponding event item is selected from the plurality of event items in the event list displayed on the second transparent substrate.

6. The mobile terminal of claim 1, wherein the controller displays, on the second transparent substrate, the object indicating the event for a prescribed time when the event is provided.

7. The mobile terminal of claim 6, wherein the controller displays, on the first transparent substrate, information relating to the event on the first transparent substrate when the object displayed on the second transparent substrate is dragged in a prescribed direction.

8. The mobile terminal of claim 7, wherein the controller controls the second transparent substrate to display the content, being displayed on the first transparent substrate, while displaying the information relating to the event on the first transparent substrate.

9. The mobile terminal of claim 1, wherein the controller detects one of direction information or length information relating to a touch input sensed on one of the first transparent substrate or the second transparent substrate, and wherein the controller adjusts transparency of the one of the first transparent substrate or the second transparent substrate based on the detected direction information or the detected length information.

10. The mobile terminal of claim 9, wherein the controller displays indicator bars when a touch input is sensed on one of the first transparent substrate and the second transparent substrate, wherein the indicator bars indicate transparency information relating to one of the first transparent substrate or the second transparent substrate.

11. The mobile terminal of claim 9, wherein the controller switches screens displayed on the respective first transparent substrate and the second transparent substrate with each other when a length of the touch input sensed on the first transparent substrate and the second transparent substrate is greater than a preset length.

12. A method of displaying on a mobile terminal that includes a terminal body, a first transparent substrate and a second transparent substrate, the method comprising:
    displaying a content on the first transparent substrate;
    detecting an event in a state where the content is displayed on the first transparent substrate;
    displaying an object indicating the event on the first transparent substrate when the event is detected, wherein the object is displayed together with the content on the first transparent substrate;
    determining whether the sensed one of the motion or the rotation of the terminal body satisfies a preset condition after the object is displayed on the first transparent substrate; and
    displaying, on the second transparent substrate, information relating to the event together with an inversed image of the content on the second transparent substrate based on the preset condition being satisfied, wherein when the information related to the event is displayed on the second transparent substrate, the object, which was displayed on the first transparent substrate, disappears from the first transparent substrate.

* * * * *